United States Patent
Hendricks

(10) Patent No.: US 10,968,602 B2
(45) Date of Patent: Apr. 6, 2021

(54) SYSTEM AND METHOD FOR MANAGING CARRYBACK THRESHOLDS IN SURFACE HAULAGE

(71) Applicant: Caterpillar Inc., Deerfield, IL (US)

(72) Inventor: Carl F. B. Hendricks, Mosman Park (AU)

(73) Assignee: Caterpillar Inc., Peoria, IL (US)

( * ) Notice: Subject to any disclaimer, the term of this patent is extended or adjusted under 35 U.S.C. 154(b) by 254 days.

(21) Appl. No.: 16/262,126

(22) Filed: Jan. 30, 2019

(65) Prior Publication Data

US 2020/0240112 A1    Jul. 30, 2020

(51) Int. Cl.
| | | |
|---|---|---|
| E02F 9/20 | (2006.01) |
| B60P 1/04 | (2006.01) |
| E02F 7/00 | (2006.01) |
| G01C 21/34 | (2006.01) |
| G05D 1/02 | (2020.01) |

(Continued)

(52) U.S. Cl.
CPC .............. *E02F 9/2054* (2013.01); *B60P 1/04* (2013.01); *E02F 7/00* (2013.01); *E02F 9/205* (2013.01); *G01C 21/34* (2013.01); *G05D 1/0212* (2013.01); *G05D 1/0287* (2013.01); *G06Q 10/06315* (2013.01); *B60S 3/04* (2013.01); *G05D 2201/021* (2013.01); *G05D 2201/0202* (2013.01)

(58) Field of Classification Search
CPC . E02F 9/2054; E02F 7/00; E02F 9/205; B60P 1/04; G01C 21/34; G05D 1/0212; G05D 1/0287; G05D 2201/0202; G05D 2201/021; G06Q 10/06315; B60S 3/04
See application file for complete search history.

(56) References Cited

U.S. PATENT DOCUMENTS 4,839,835 A * 6/1989 Hagenbuch ............... G01S 1/70
                                                                 702/174
5,002,340 A * 3/1991 Loggins .................. B60P 1/006
                                                                 298/1 B (Continued)

FOREIGN PATENT DOCUMENTS

| GB | 2537590 | 10/2016 |
| GB | 2537590 A | 10/2016 |

(Continued)

*Primary Examiner* — Yazan A Soofi
*Assistant Examiner* — Naeem Taslim Alam
(74) *Attorney, Agent, or Firm* — Leydig, Voit & Mayer, Ltd.

(57) ABSTRACT

A machine routing and planning system for mobile machines at a work site includes a plurality of haul trucks, at least one loading machine, and a controller. The controller is configured to generate an initial material movement plan based upon an initial number of loading machines and haul trucks and the initial carryback threshold, and generate initial movement command signals to operate the loading machines and haul trucks at the work site based upon the initial material movement plan. The controller is further configured to generate a modified material movement plan based upon a modified number of loading machines and haul trucks and the modified carryback threshold, and generate modified movement command signals to operate the loading machines and haul trucks at the work site based upon the modified material movement plan.

20 Claims, 11 Drawing Sheets

(51) Int. Cl.
    *G06Q 10/06*     (2012.01)
    *B60S 3/04*     (2006.01)

(56) References Cited

U.S. PATENT DOCUMENTS

| | | | |
|---|---|---|---|
| 5,416,706 A * | 5/1995 | Hagenbuch | G01G 19/08 |
| | | | 177/136 |
| 5,631,832 A * | 5/1997 | Hagenbuch | G07C 5/085 |
| | | | 701/29.6 |
| 2012/0229639 A1 | 9/2012 | Singleton | |
| 2014/0054925 A1* | 2/2014 | Hyde | B60P 1/286 |
| | | | 296/183.2 |
| 2014/0297091 A1* | 10/2014 | Itoi | H04Q 9/00 |
| | | | 701/24 |
| 2015/0002303 A1* | 1/2015 | Stanley | B65G 67/04 |
| | | | 340/666 |
| 2015/0112954 A1* | 4/2015 | Collins | G06Q 10/083 |
| | | | 707/702 |
| 2016/0134995 A1* | 5/2016 | McCoy | H04W 4/80 |
| | | | 455/41.2 |
| 2017/0060126 A1* | 3/2017 | Marsolek | E01C 19/48 |
| 2017/0192431 A1* | 7/2017 | Foster | G05D 1/0088 |
| 2018/0179732 A1 | 6/2018 | Bartsch et al. | |
| 2020/0074766 A1 | 3/2020 | Onishi | |
| 2020/0362531 A1* | 11/2020 | Ready-Campbell | E02F 3/439 |

FOREIGN PATENT DOCUMENTS

| | | |
|---|---|---|
| JP | 9-33326 A | 2/1997 |
| JP | 2017-95061 A | 6/2017 |
| JP | 2017095061 | 6/2017 |

* cited by examiner

SYSTEM AND METHOD FOR MANAGING CARRYBACK THRESHOLDS IN SURFACE HAULAGE

TECHNICAL FIELD

This disclosure relates generally to mobile haul machines for moving material and, more particularly, to a system for operating haul machines through the management of carryback thresholds with respect to carryback material within the dump body of the haul machine.

BACKGROUND

Machines such as haul trucks or haul machines are used in various industries to transport or move material from one location to another. When using a haul truck to haul material, under certain conditions, some of the material may adhere or stick to the interior surface of the dump body of the haul truck after each dumping operation. The material remaining in the dump body may be referred to by different terms such as carry back, residual load, or deadbed.

Carryback material remaining in the dump body is undesirable because it reduces machine productivity. More specifically, carryback material reduces the effective capacity (e.g., volume) of the dump body thus requiring a greater number of haul cycles to move a desired amount of material from the loading site to the dump site. Further, the increased weight of the dump body due to carry back material also reduces the fuel efficiency of the haul trucks. Each of these decreases the efficiency of the material moving process.

U.K. Patent Application No. 2537590 discloses a tipper truck having tipper body that may be pivoted by a hydraulic cylinder to empty the tipper body. A pressure parameter is measured relating to the hydraulic pressure of the hydraulic cylinder. A residual load may be measured within the tipper body based upon the pressure parameter.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In a first aspect, a machine routing and planning system for mobile machines at a work site includes a plurality of haul trucks, at least one loading machine, and a controller. Each haul truck has a dump body with an interior surface for hauling material. The at least one loading machine being configured to load material into the dump body of each haul truck. The controller is configured to access an initial number of loading machines and haul trucks operating at the work site, access an initial carryback threshold for the interior surface of each haul truck based on the initial number of loading machines and haul trucks operating at the work site, generate an initial material movement plan based upon the initial number of loading machines and haul trucks and the initial carryback threshold, and generate initial movement command signals to operate the loading machines and haul trucks at the work site based upon the initial material movement plan. The controller is further configured to access a modified number of loading machines and haul trucks operating at the work site, access a modified carryback threshold for the interior surface of each haul truck based on the modified number of loading machines and haul trucks operating at the work site, generate a modified material movement plan based upon the modified number of loading machines and haul trucks and the modified carryback threshold, and generate modified movement command signals to operate the loading machines and haul trucks at the work site based upon the modified material movement plan.

In another aspect, a method of machine routing and planning for mobile machines at a work site includes accessing an initial number of loading machines and haul trucks operating at the work site, with the haul trucks having a dump body for hauling material, and the loading machines being configured for loading material into the dump body of each haul truck, and accessing an initial carryback threshold for an interior surface of each haul truck based on the initial number of loading machines and haul trucks operating at the work site. The method further includes generating an initial material movement plan based upon the initial number of loading machines and haul trucks and the initial carryback threshold, generating initial movement command signals to operate the loading machines and haul trucks at the work site based upon the initial material movement plan, accessing a modified number of loading machines and haul trucks operating at the work site, accessing a modified carryback threshold for the interior surface of each haul truck based on the modified number of loading machines and haul trucks operating at the work site, generating a modified material movement plan based upon the modified number of loading machines and haul trucks and the modified carryback threshold, and generating modified movement command signals to operate the loading machines and haul trucks at the work site based upon the modified material movement plan.

DETAILED DESCRIPTION

Figure 1:
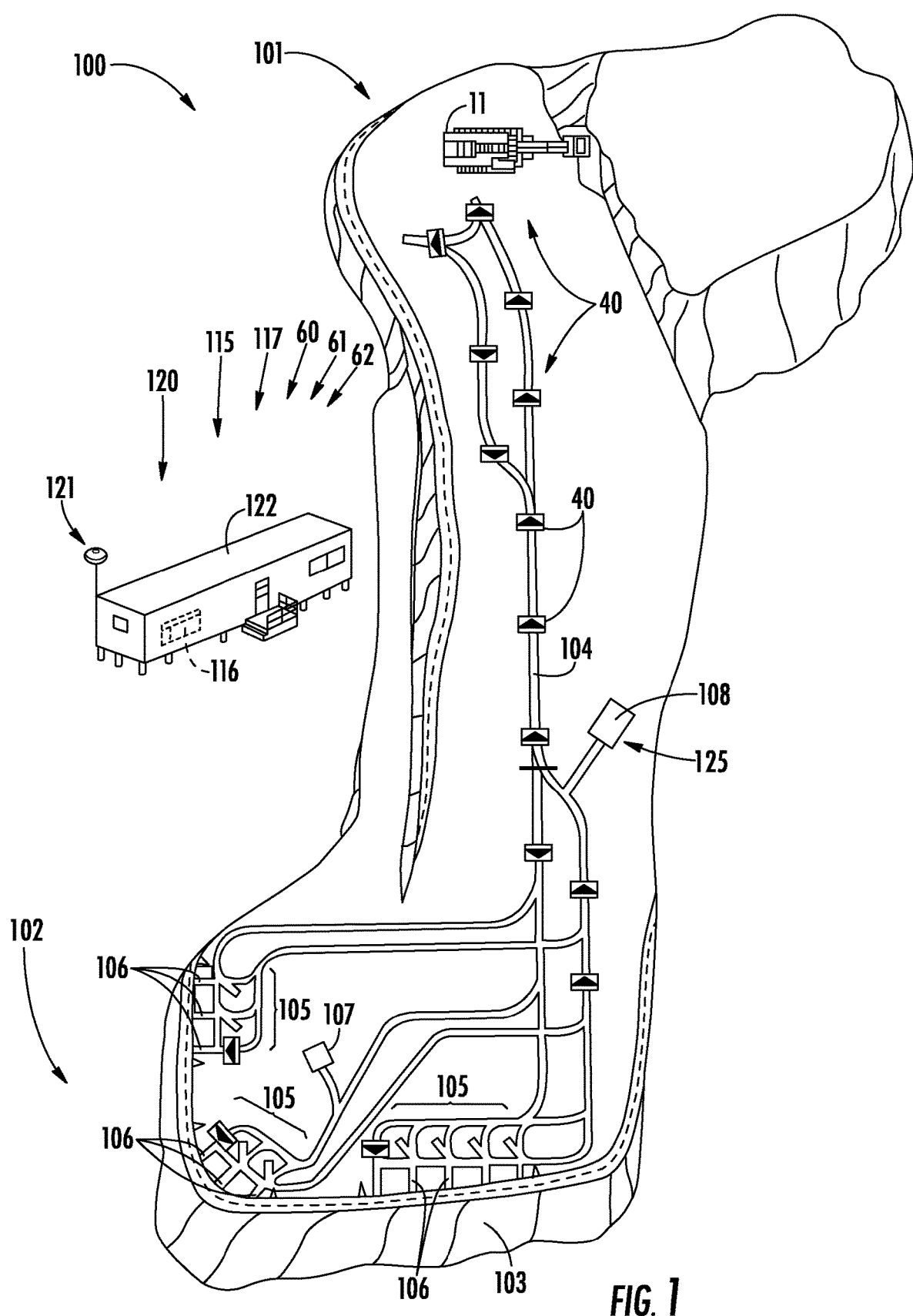
FIG. 1 depicts a diagrammatic illustration of a work site at which the principles disclosed herein may be used.

FIG. 1 illustrates an exemplary work site 100 at which one or more machines 10 may operate in an autonomous, a semi-autonomous, or a manual manner to move material from one location at the work site 100 to another location at the work site or to a further location at a location remote from the work site. Work site 100 may be a portion of, for example, a mine site, a construction site, a road work site, a landfill, a quarry, a forest, or any other type of site. As depicted in FIG. 1, an excavator 11 is being used to load material onto a haul truck 40 although any type of machine may be used to load the material and any type of machine may be used to subsequently transport the material.

Work site 100 may include multiple locations designated for particular purposes. For example, a first location may be designated as a load location 101 at which one or more loading machines, such as an excavator 11 or other machines, operate to fill one or more haul trucks 40 with material. A second location may be designated as a dump location 102 at which the haul trucks 40 discharge or dump their payloads. In the disclosed embodiment, the dump location 102 is positioned at an edge of a steep incline, crest, or cliff area often referred to as a high wall 103. In this embodiment, haul trucks 40 may operate to discharge their payloads over the edge of the high wall 103. Haul trucks 40 may follow a main travel path 104 that generally extends between load location 101 and dump location 102.

Dump location 102 may be divided into groupings 105 of dump targets 106 at which haul trucks 40 may discharge their payloads. It is contemplated that dump location 102 may have any number of groupings 105. By having multiple groupings 105 at dump location 102, more than one haul truck 40 may operate at dump location 102 at the same time without traffic problems and significant time delays.

A control system 115 indicated generally by an arrow in FIG. 1 associated with the work site 100 may operate to control certain aspects of the machine operation at the work site and also communicate information between the machines and between the machines and a back office or remote system 120. The control system 115 may be a stand-alone system or may include other systems including those within or associated with the various machines 10 such as the control systems of the machines described below Control system 115 may include components at the work site 100 and may also include components located remotely from the work area. As a result, the functionality of control system 115 may be distributed so that certain functions are performed at the work site 100 and other functions are performed remotely, such as at a remote operations center. The control system 115 may include a communications system including both a wireless communications system 121 at a command center 122 and a wired communications systems (not shown) for transmitting signals between components.

The control system 115 may include an electronic control module or controller 116 that may receive various input signals from wireless communications system 121, wired communications systems (not shown), control systems and sensors associated with machines 10, or from any other source. The control system 115 and controller 116 may control and provide input to the operation of various aspects of the work site 100 including the specific tasks and operations performed by machines 10.

The controller 116 may be an electronic controller that operates in a logical fashion to perform operations, execute control algorithms, store and retrieve data and other desired operations. The controller 116 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 116 such as power supply circuitry, signal conditioning circuitry, driver circuitry, and other types of circuitry.

The controller 116 may be a single controller or may include more than one controller disposed to control various functions and/or features of the control system 115. For example, the controller 116 may include machine controllers associated with machines 10. The term "controller" is meant to be used in its broadest sense to include one or more controllers and/or microprocessors that may be associated with the work site 100 and/or the machines 10 and that may cooperate in controlling various functions and operations at the work site and of the machines. The functionality of the controller 116 may be implemented in hardware and/or software without regard to the functionality. The controller 116 may rely on one or more data maps relating to the operating conditions and environment at the work site 100 as well as characteristics and capabilities of the machines 10 that may be stored in the memory of controller. Each of these data maps may include a collection of data in the form of tables, graphs, and/or equations.

The excavator 11 has multiple systems and components that cooperate to move material in a desired manner. The excavator 11 may include an implement system 12 comprising a swing member or platform 13, an undercarriage 14, and a linkage assembly 16 including a work implement configured as a bucket 17. The platform 13 may be rotatably disposed on the undercarriage 14 and may include an operator station 18 from which an operator may control some or all of the operations of the excavator 11. Rotation of the platform 13 relative to the undercarriage 14 may be effected by a swing motor indicated generally at 19.

The undercarriage 14 may be a structural support for one or more traction devices 20 configured as ground engaging tracks operative to allow translational motion of the excavator 11 across a work surface and thus permit the implement system 12 to be a movable implement system. Alternatively, the traction devices 20 may be configured as wheels, belts, or other traction devices known in the art.

A prime mover 15 may provide power for the operation of the excavator 11. In one embodiment, the prime mover 15 may embody a combustion engine, such as a diesel engine, a gasoline engine, a gaseous fuel powered engine (e.g., a natural gas engine), or any other type of combustion engine known in the art. The prime mover 15 may alternatively embody a non-combustion source of power, such as an electrical source including a fuel cell or a power storage device such as a battery coupled to a motor. The prime mover 15 may provide a rotational output to drive the traction devices 20, thereby propelling the excavator 11. The prime mover 15 may also provide power to other systems and components of the excavator 11.

The linkage assembly 16 may include one or more linkage members configured to move the bucket 17. In one example, the linkage assembly 16 may include a boom member 22 and a stick member 23. A first end of the boom member 22 may be pivotally connected to the platform 13, and a second end of the boom member may be pivotally connected to a first end of the stick member 23. The bucket 17 may be pivotally or movably connected to a second end of stick member 23.

Each linkage member may include and be operatively connected to one or more actuators such as hydraulic cylinders. More specifically, the boom member 22 may be propelled or moved along a path by one or more boom hydraulic cylinders 25. The stick member 23 may be propelled by a stick hydraulic cylinder 26. Rotation of the bucket 17 relative to the stick member 23 may be effected by work implement hydraulic cylinders 27. The linkage members may translate or rotate in a plane that is generally orthogonal to the work surface. Other types of actuators are contemplated such as electric motors, pneumatic motors, or any other actuation devices.

Figure 2:
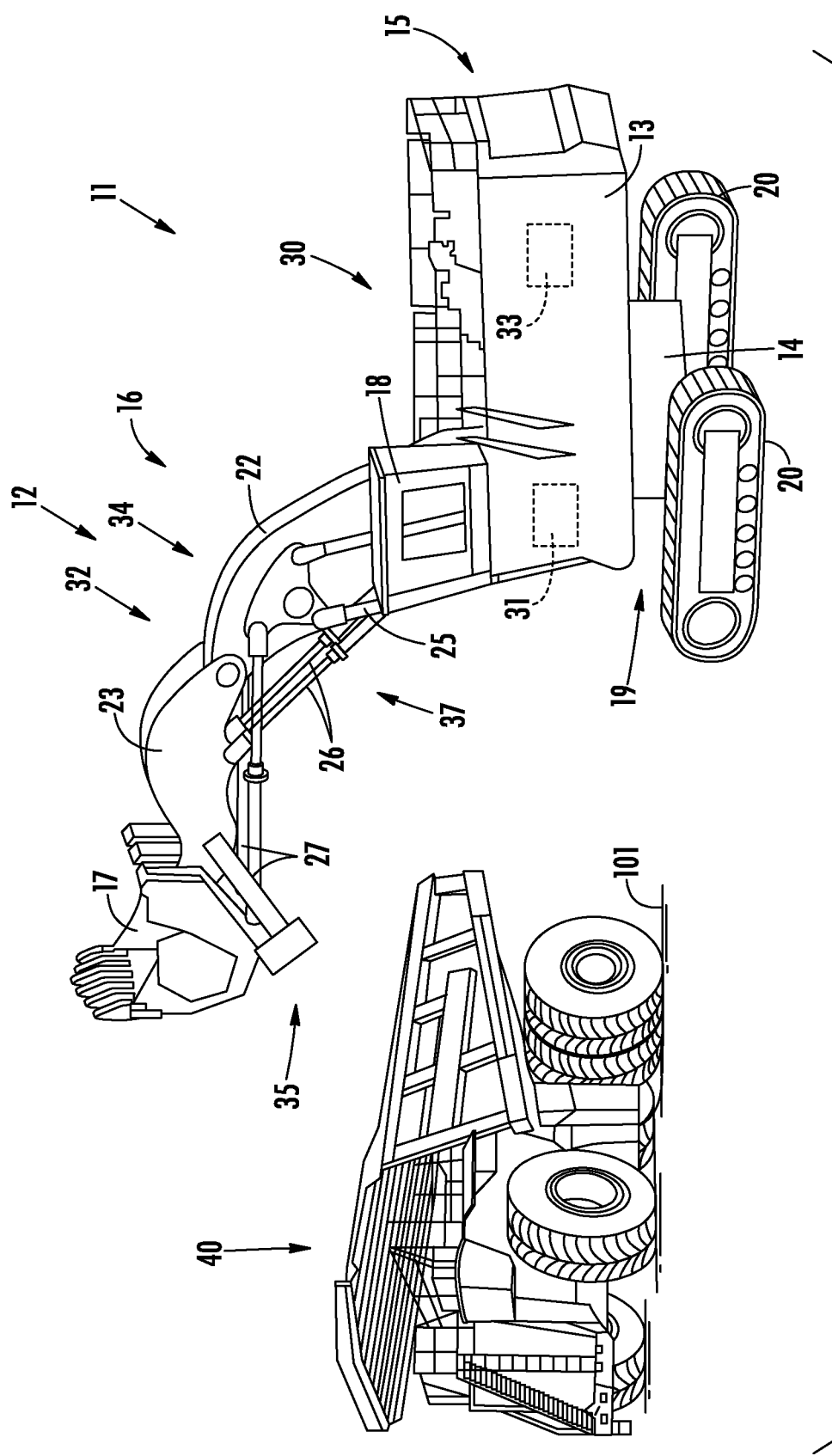
FIG. 2 depicts a perspective view of a loading machine and a haul truck operating at the work site of FIG. 1.

The excavator 11 may include and be controlled by an excavator control system 30 as shown generally by an arrow in FIG. 2 indicating association with the machine. The excavator control system 30 may include an electronic control module or controller such as an excavator controller 31 that controls the operation of various aspects of the excavator 11 including the drivetrain and the hydraulic systems. The excavator control system 30 and the excavator controller 31 may be identical or similar in structure and operation to the control system 115 and the controller 116 of the work site, respectively, described above and their descriptions are not repeated herein. The excavator control system 30 and the excavator controller 31 may be located on the excavator 11 and may also include components located remotely from the excavator such as on any of the other machines 10 at the work site 100 or at a command center 122. The functionality of excavator controller 31 may be distributed so that certain functions are performed on the excavator 11 and other functions are performed remotely.

The excavator 11 may be equipped with a plurality of sensors that provide data indicative (directly or indirectly) of various operating parameters of the machine and/or the operating environment in which the machine is operating. The term "sensor" is meant to be used in its broadest sense to include one or more sensors and related components that may be associated with the excavator 11 and that may cooperate to sense various functions, operations, and operating characteristics of the machine and/or aspects of the environment in which the machine is operating.

An implement system pose sensing system 32, as shown generally by an arrow in FIG. 2 indicating association with the excavator 11, includes an implement system pose sensor 33 to sense the position and orientation (i.e., the heading, pitch, roll or tilt, and yaw) of the implement system 12 relative to the work site 100. The position and orientation are sometimes collectively referred to as the pose. The implement system pose sensor 33 may include a plurality of individual sensors that cooperate to generate and provide pose signals to the excavator controller 31 indicative of the position and orientation of the implement system 12.

In one example, the implement system pose sensor 33 may include one or more sensors that interact with a positioning system such as a global navigation satellite system or a global positioning system to operate as a pose sensor. In another example, the implement system pose sensor 33 may further include a slope or inclination sensor such as a pitch angle sensor for measuring the slope or inclination of the implement system 12 relative to a ground or earth reference. The excavator controller 31 may use the implement system pose signals from the implement system pose sensor 33 to determine the pose of the implement system 12 within work site 100. In other examples, the implement system pose sensor 33 may include an odometer or another wheel rotation sensing sensor, a perception based system, or may use other systems such as lasers, sonar, or radar to determine all or some aspects of the pose of implement system 12.

In an embodiment, the implement system pose sensor 33 may include first pose sensor for determining the position of an aspect of the excavators, such as the platform 13 or the undercarriage 14, together with a plurality of angle sensors indicated generally at 34 located near one or more joints of the linkage members (i.e., the boom joint between the platform 13 and the boom member 22, the stick joint between the boom member 22 and the stick member 23, and the implement joint between the bucket 17 and the stick member 23). In some instances, the overall position of the excavator 11 may be determined as a function of the undercarriage 14. In such case, the plurality of angle sensors 34 may include an angle sensor to determine the relative angle between the platform 13 and the undercarriage 14. The angle sensors 34 may include inertial measurement units, rotary encoders, potentiometers, or other angle or sensing devices for measuring the relative angular position of components.

In an alternate embodiment, the angle sensors 34 may measure the displacement of an actuator and the joint angles may be calculated based upon the position of the actuators and the dimensions of the linkage members. In another alternate embodiment, any or all of the angle sensors 34 may be configured to measure an angular velocity or an angular acceleration rather than angular position. Regardless of the type of the angle sensors 34, the excavator controller 31 may use output signals from the angle sensors to determine the position of each linkage member and the bucket 17 relative to the platform 13 and/or undercarriage 14.

The positions of the components of the excavator 11 including the implement system 12 may be determined based upon the kinematic model of the machine together with the dimensions of the platform 13, undercarriage 14, boom member 22, stick member 23, and bucket 17, as well as the relative positions between the various components. More specifically, the excavator controller 31 may include a data map that identifies the position of each component of the excavator 11 based upon the relative positions between the various components. The excavator controller 31 may use the position of the platform 13 and/or undercarriage 14 together with the dimensions and the positions of the various components to determine the position of each component of the excavator 11 relative to the work site 100. The operating characteristics and kinematics of the excavator 11 may be stored within or accessed by the excavator controller 31 or any other controller such as controller 116.

Figure 3:
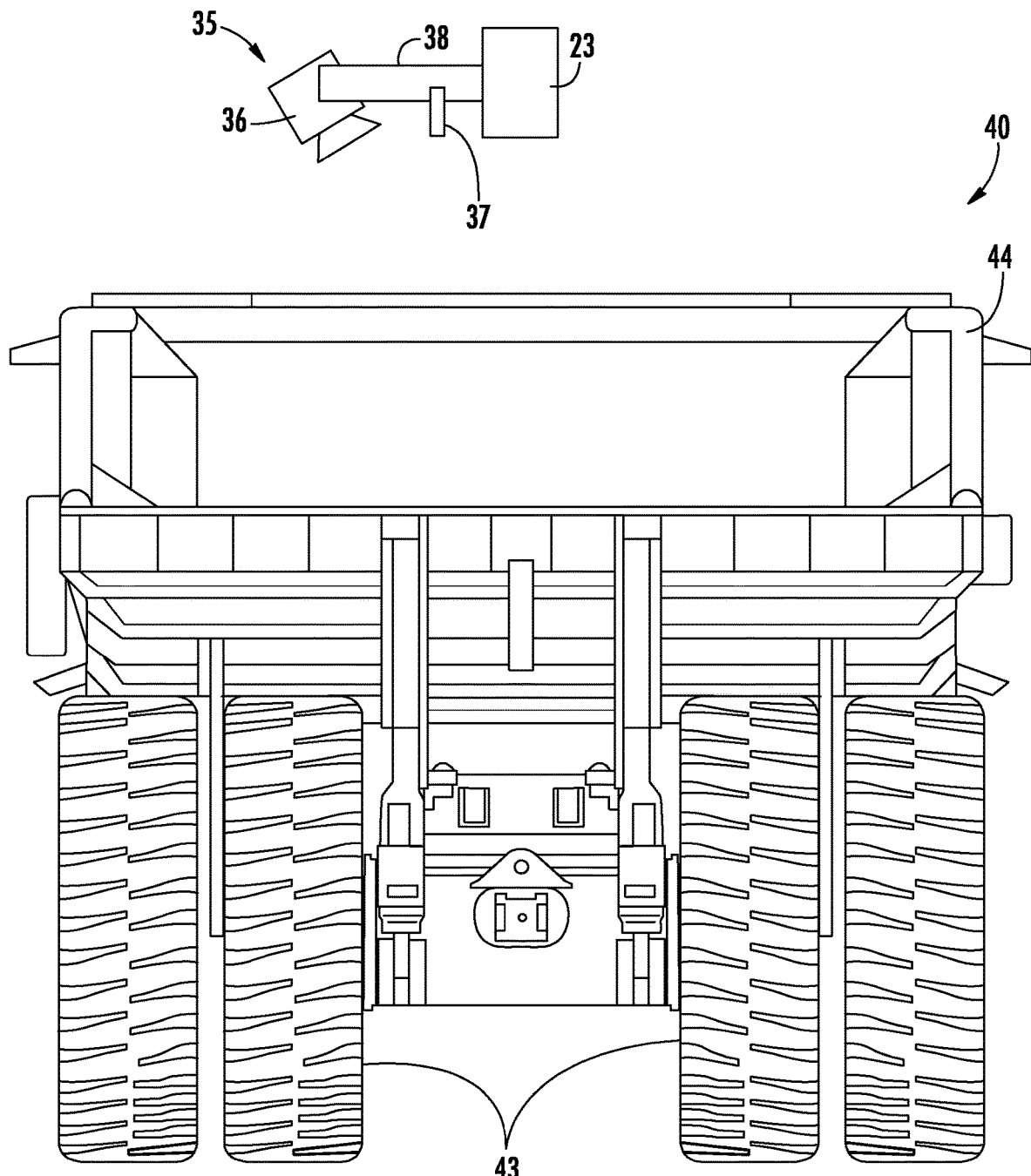
FIG. 3 depicts a diagrammatic rear view the haul truck of FIG. 2 with a perception monitor positioned above the dump body of the haul truck.

Referring to FIGS. 2-3, a perception system 35 may be disposed or positioned proximate to the bucket 17. The perception system 35 may include one or more systems such as an optical system (e.g., a camera system), a thermal or infrared imaging system, a radar system, a LIDAR system, and/or any other desired system that operates with associated perception sensors to detect the configuration of material within the dump body 44 of a haul truck 40 as described in further detail below. In an embodiment, the perception system 35 may be configured as an optical system and include perception sensors such as a camera system 36 having a single camera or multiple cameras. In some embodiments, it may be desirable to provide a light source 37 to improve, add or emphasize the contrast and/or otherwise improve the performance of the camera system 36 with respect to the analysis of the dump body 44.

The perception sensors such as the camera system 36 may generate perception signals or data that is received by the excavator controller 31 or the controller 116 and used to determine the position of carryback material on the interior surface 46 of the dump body 44 of a haul truck 40 as described below. To do so, the perception system 35 may be used to generate an electronic map and/or images of the interior surface 46 of the dump body of a haul truck 40. The perception system 35 may use the camera system 36 or any other sensors mounted to generate perception data. In an embodiment, each camera of the camera system 36 may be mounted on the excavator 11 at a relatively high vantage point such as on a cantilevered beam 38 extending from the stick member 23 adjacent the bucket 17. The perception sensors such as camera system 36 may be positioned at other locations as desired.

Figure 4:
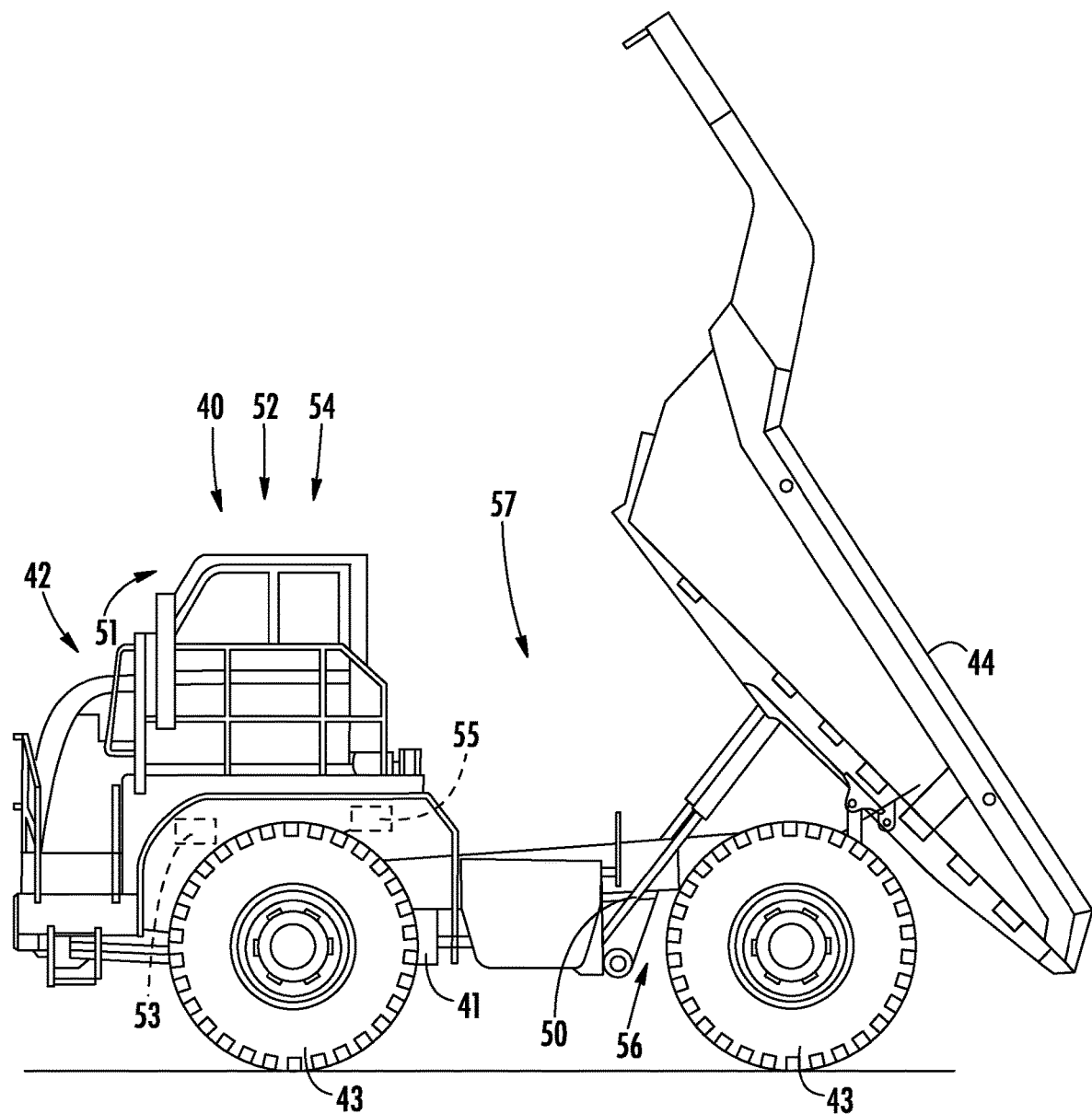
FIG. 4 depicts a side view of the haul truck of FIG. 2.

Referring to FIG. 4, a diagrammatic illustration of a haul truck 40 for hauling or transporting material is depicted. The haul truck 40 includes a frame 41, and a prime mover such as engine 42 operatively connected to drive wheels 43 to propel the machine. The haul truck 40 may use any type of machine propulsion and drivetrain mechanisms including hydrostatic, electric, or a mechanical drive.

Figure 5:
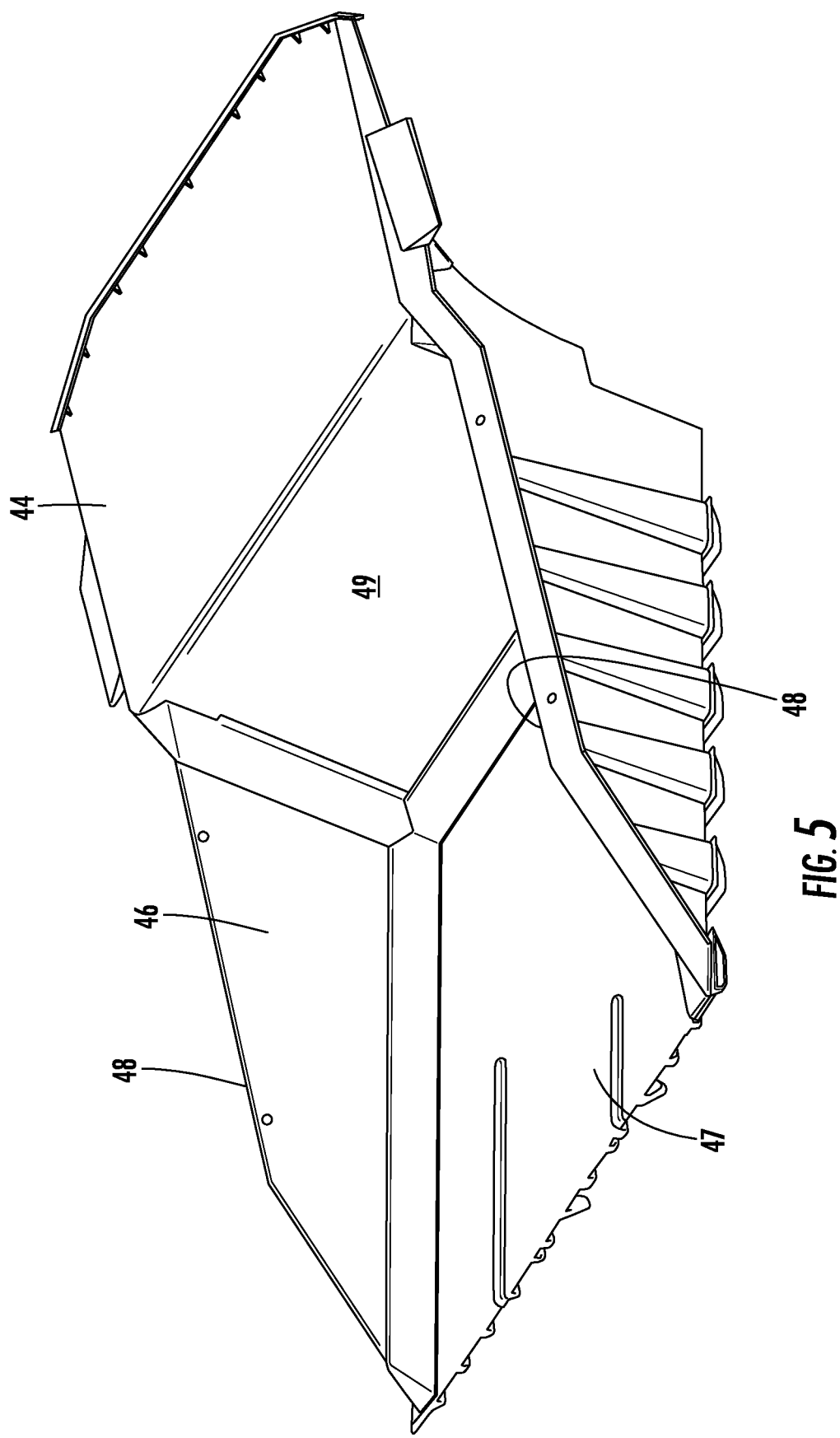
FIG. 5 depicts a rear perspective view of the dump body of the haul truck of FIG. 4.

A payload container or dump body 44 may be pivotally mounted on frame 41 and configured to carry material. Referring to FIG. 5, the interior surface 46 of the dump body 44 may have one of many different configurations. The interior surface 46 may be defined by the configuration of the lower surface 47, opposite sidewalls 48, and front wall 49. Referring back to FIG. 4, actuators such as hydraulic cylinders 50 may extend between the frame 41 and the dump body 44. The actuators may be actuated to dump material within the dump body 44 as desired.

The haul truck 40 may include a cab 51 that an operator may physically occupy and provide input to control the machine. Cab 51 may include one or more input devices (not shown) through which the operator may issue commands to control the propulsion and steering of the machine as well as dump the dump body 44.

The haul truck 40 may include and be controlled by a haul truck control system 52 as shown generally by an arrow in FIG. 3 indicating association with the machine. The haul truck control system 52 may include an electronic control module or controller such as a haul truck controller 53 that controls the operation of various aspects of the haul truck 40 including the drivetrain and the hydraulic systems. The haul truck control system 52 and the haul truck controller 53 may be identical or similar in structure and operation to the control system 115 and the controller 116 of the work site, respectively, described above and their descriptions are not repeated herein. The haul truck control system 52 and the haul truck controller 53 may be located on the haul truck 40 and may also include components located remotely from the haul truck such as on any of the other machines 10 at the work site 100 or at a command center 122. The functionality of haul truck controller 53 may be distributed so that certain functions are performed on the haul truck 40 and other functions are performed remotely. The operating characteristics and reference profile of the haul truck 40 may be stored within or accessed by the haul truck controller 53 or any other controller such as controller 116.

The haul truck 40 may be equipped with a plurality of sensors indicated generally that provide data indicative (directly or indirectly) of various operating parameters of the machine. As stated above with respect to the excavator 11, the term "sensor" is meant to be used in its broadest sense to include one or more sensors and related components that may be associated with the haul truck 40.

The plurality of sensors of haul truck 40 may include a haul truck pose sensing system 54 similar in some respects to the implement system pose sensing system 32 described above. As shown in FIG. 4, the haul truck pose sensing system 54 may include a haul truck pose sensor 55 having a plurality of individual sensors that cooperate to generate and provide pose signals to the haul truck controller 53 indicative of the position and orientation (i.e., the heading, pitch, roll or tilt, and yaw) of the haul truck 40 relative to the work site 100. The sensors associated with the haul truck 40 may include sensors that are identical or similar to those described above with respect to the excavator 11 and thus the descriptions thereof are not repeated herein. In addition, haul truck 40 may include a dump body angle sensor 56 to determine the position of the dump body 44 relative to frame 41 or some other point of reference. The haul truck pose sensing system 54 in combination with the dump body angle sensor 56 may operate as a dump body pose sensor to determine the pose of the dump body 44 relative to the work site 100.

The haul truck control system 52 may also include a payload estimation system generally indicated at 57. The payload estimation system 57 may determine an estimate of the payload within the dump body 44 of the haul truck 40. In an embodiment, the payload estimation system 57 may operate by measuring the pressure on the hydraulic cylinders 50.

The excavators 11 and the haul trucks 40 operating at the work site 100 may be configured to be operated autonomously, semi-autonomously, or manually. In case of semi-autonomous or manual operation, the machines may be operated by remote control and/or by an operator physically located within their cab. If a machine is configured to operate via a remote control system, a visual image system (not shown) such as a camera system may be provided for generating visual images indicative of a point of view relative to the machine. The visual image signals may be transmitted wirelessly through a wireless network system 121 to a system remote from the machines such as an off-board control system 115.

Inasmuch as operations performed at the work site 100 and by the excavator 11 and the haul truck 40 may be planned or controlled by any of the excavator control system 30, the haul truck control system 52, or the control system 115, or any combination thereof, as well as the excavator controller 31, the haul truck controller 51, or the controller 116, or any combination thereof, references herein to systems and operations of the control system 115 and/or the controller 116 may refer to systems and operations of any of the excavator control system 30, the haul truck control system 52, or the control system 115, or any combination thereof, as well as the excavator controller 31, the haul truck controller 51, or the controller 116, or any combination thereof.

The control system 115 may include a carryback monitoring system 60 (FIG. 1) operative to monitor in an autonomous or semi-autonomous manner the amount of carryback material within the dump body 44 of each haul truck 40 and determine whether a carryback threshold has been reached. Upon determining that the dump body 44 is carrying an amount of carryback material that exceeds a carryback threshold, the haul truck 40 may be identified or designated for cleaning out the interior surface 46 to remove the carryback material. To determine whether the amount of carryback material exceeds the carryback threshold, the current profile of the interior surface 46, which includes the shape of the interior surface as modified by the carryback material, may be compared to a reference profile of the interior surface that includes no carryback material (i.e., is completely empty).

Dump bodies 44 may be designed or configured based upon any combination of goals in view of the materials to be hauled. Such goals may include maximizing payload, maximizing durability, maximizing hauling efficiency (i.e. maximizing tons/hr), and/or minimizing spillage. Accordingly, the reference profile of the interior surface 46 of the dump body 44 may be different for each haul truck 40. Examples of aspects of the interior surface 46 of a dump body 44 that may vary from one dump body to another include: 1) whether the lower surface 47 is flat or another shape (e.g., "ducktail"); 2) the slope of the lower surface 47; 3) the height of the sidewalls 48 relative to the lower surface 47; 4) the slope or angle between the lower surface 47 and the sidewalls 48; 5) the height of the front wall 49 relative to the lower surface 47; 6) the slope or angle between the lower surface 47 and the front wall 49; and 7) the amount of curvature at each intersection or junction between components such as between the lower surface 47 and the sidewalls 48, between the lower surface 47 and the front wall 49, and between the sidewalls 48 and the front wall 49.

In addition, the interior surface 46 may undergo changes over time so that it may be desirable to periodically update the reference profiles. In one example, aspects of the interior surface may be modified due to damage or repairs. In another example, a liner may be applied or removed from the interior surface.

The carryback monitoring system 60 may store a reference profile for each haul truck 40 operating at the work site. The reference profiles may take the form of an electronic map or three-dimensional computer image. In some embodiments, the reference profile of each haul truck 40 may be stored together with identifying information such as a code corresponding to each truck as part of the data maps of the excavator controller 31 on-board the excavator 11, within the haul truck controller 53 on-board the haul truck, or at a remote location such as within the controller 116.

In one embodiment, the carryback monitoring system 60 may operate by positioning a perception system 35, such as the camera system 36 located adjacent the bucket 17 of the excavator 11, at a position above the interior surface 46 of the dump body 44 of a haul truck 40. Perception data may be captured by the perception system 35 and used to create or define an electronic map of the current profile of the interior surface 46. When using this process, the perception data is captured while the dump body 44 is empty, such as prior to emptying the first bucket of material into the dump body 44. To do so, the perception system 35 is positioned above the interior surface 46 of the dump body 44 so that the captured perception data includes the present or current interior surface of the dump body. As a result, the current profile of the interior surface 46, including the carryback material, is captured by the perception system.

The pose of the perception system 35 may be determined by the implement system pose sensor 33 together with the kinematics of the implement system 12. Thus, the implement system pose sensor 33 together with the kinematics of the implement system 12 may operate as a perception system pose sensor that generates perception system pose signals or data. The perception data captured by the perception system 35 may then be combined with the pose of the perception system to generate an electronic image or map of the field of view of the perception system relative to the work site 100. This electronic map will include the current profile of the interior surface 46 of the dump body 44.

The pose of the dump body 44 may be determined by the haul truck pose sensor 55 as described above. By knowing the pose of the dump body 44 and the reference profile of the interior surface 46 of the dump body, an electronic map or model of the reference profile relative to the work site 100 may be generated.

After determining the pose of the current profile of the interior surface 46 of the dump body 44 and the pose of the reference profile, the carryback monitoring system 60 may compare the current profile to the reference profile to determine the amount of carryback material located within the dump body. If the amount of carryback material exceeds a threshold amount (e.g., a percentage of the volume or weight of the dump body 44), the haul truck 40 may be designated as requiring cleaning or emptying of the carryback material. In some instances, the location of the carryback may also be a factor in determining whether a clean out operation is desired or required.

In one example, the haul trucks 40 may be sent to a clean out station sequentially upon exceeding the carryback threshold. In another example, upon a haul truck 40 being designated for clean out, the haul truck may be routed to a specific dump location 102 to facilitate subsequent clean out. For example, the clean out station 107 may be near a specific dump location or the clean out station may be between the dump location 102 and the next load location 101 such at a clean out station 108 along the main travel path 104.

Other embodiments are contemplated. For example, the perception system 35 may be disposed adjacent the dump location 102 rather than on the excavators 11 so that each haul truck 40 is inspected after its most recent dump cycle. By positioning the perception system 35 adjacent the dump location 102, the current profile of each dump body 44 may be generated or determined after the most recent loading cycle. This may result in a more accurate current profile and a more efficient clean out operation.

In another embodiment, the perception system 35 may be located near the clean out station 108 along the main travel path 104 with each haul truck 40 passing the perception system on its way back to the load location 101. From the foregoing, it may be understood that the perception system 35 may be located at any position at the work site 100. The perception system 35 may be positioned at a location sufficiently high to permit scanning the interior surface 46 of the dump body 44. A pose sensing system may be associated with each perception system regardless of its location to permit the generation of an electronic map of the carryback material on the interior surface 46 of the dump body 44 being scanned.

In still another embodiment, a first perception system 35 and a second perception system 125 (together with a pose sensing system) may be provided. In one embodiment, the first perception system 35 may be disposed on each excavator 11 and the second perception system 125 disposed either adjacent the clean out station 107, 108. The first perception system 35 may be operative to generate a first current profile of the interior surface 46 of the dump body 44 sufficient to determine whether a clean out operation is desired or necessary and the second perception system 125 may be operative to generate a second current profile that is used during the clean out process. In some instances, the first perception system 35 may be less complex or accurate than the second perception system 125, so as to reduce costs or simplify its operation while the second perception system may be more complex or accurate to provide a more accurate current profile immediately prior to the clean out operation.

In an additional embodiment, the payload detection system 57 may be used to determine whether a clean out operation is desired or required and a single perception system 35 provided to generate the current profile used for the clean out operation.

The excavator control system 30 may further include a carryback clean out system 61 (FIG. 1) operative to clean out or remove the carryback material from the interior surface 46 of a dump body 44 in an autonomous or semi-autonomous manner. The carryback clean out system 61 may be used to clean out a dump body 44 regardless of the manner in which a clean out designation has been made. For example, such determination may be made in an automated manner such as with the carryback monitoring system 60 or manually by an observer such as an operator of a excavator 11. In another example, the control system 115 may monitor the number of load and dump cycles of each haul truck 40 since the previous clean out cycle and designate each haul truck for clean out after a specified number of cycles. The specified number may be dependent upon the characteristics of the material being hauled and the configuration of the interior surface 46 of the dump body 44, and production objectives and performance goals as described below.

Figure 6:
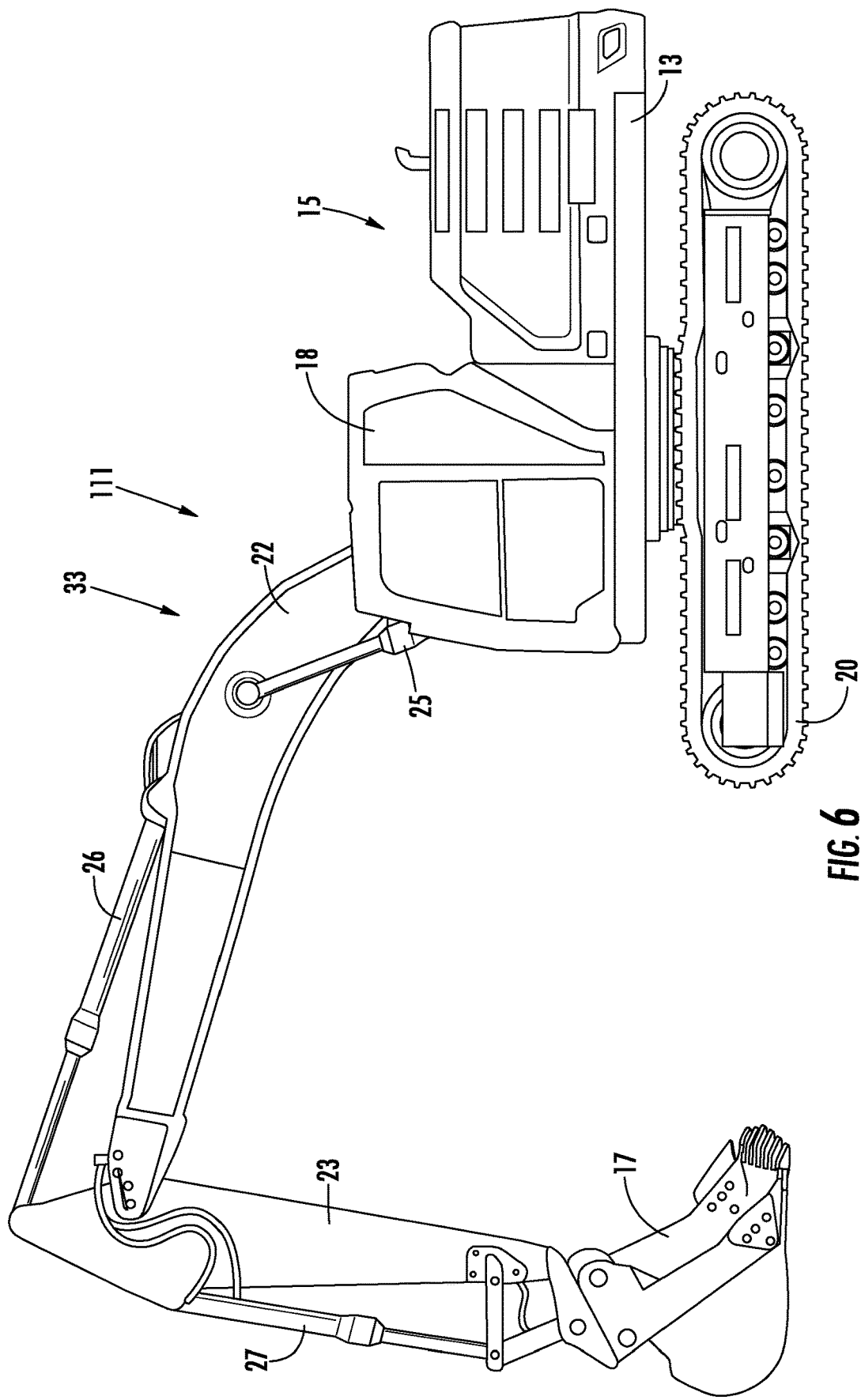
FIG. 6 depicts a side view of an excavator for use with the systems disclosed herein.

Regardless of the manner in which a clean out designation has been made, upon designating or scheduling a haul truck 40 for a clean out operation, the haul truck may be moved to a clean out location and positioned adjacent a clean out mechanism. In one embodiment, a clean out mechanism may be configured as a relatively small excavator 111 depicted in FIG. 6 with a clean out implement such as a bucket 17. The small excavator 111 maybe similar or identical to the excavator 11 described above and have the same functionality. Like reference numbers refer to identical or similar components and descriptions thereof are not repeated herein for purposes of brevity. In another embodiment as described in more detail below, the clean out mechanism may be a water based system such as a water cannon 70 (FIG. 7) and the clean out implement may be a nozzle 73.

In an embodiment, the carryback clean out system 61 may operate by positioning the haul truck 40 requiring clean out adjacent the excavator 111 at the clean out location. In some instances, it may be desirable to fully extend the hydraulic cylinders 50 operatively connected to the dump body 44 to fully raise the dump body to its dump position while performing the clean out operation. In other instances, it may be desirable to only partially extend the hydraulic cylinders 50 to only partially raise the dump body from its haul position on the frame 41. The pose of the dump body 44 may be determined by the dump body pose sensor defined by a combination of the haul truck pose sensing system 54 and the dump body angle sensor 56. In other words, the pose of the dump body may be determined based upon the pose of the haul truck 40 and the relative angle of the dump body 44 relative to the frame 41.

Using the pose of the dump body 44, the reference profile, and the current profile of the interior surface 46, the carryback clean out system 61 may determine the pose of the reference profile and the location of the carryback material on the interior surface of the dump body. The location of the carryback material may be stored as an electronic model within the controller 116.

The excavator 111 may be moved to a desired position adjacent the dump body 44. The pose of the excavator 111 may be determined by the implement system pose sensor 33. The position of the bucket 17 of the excavator 111 may be determined based upon the pose of the excavator and the kinematic model of the excavator. Using the kinematic model of the excavator 111 and the pose of the excavator as well as the pose of the reference model of the interior surface 46 of the dump body 44, the carryback clean out system 61 may determine a plan for automated removal of the carryback material. The plan for removing the carryback material may include moving a work implement such as the bucket 17 along a path formed or defined by a plurality of cycles or routes to move the work implement about the interior surface 46 of the dump body 44 about the interior surface 46 to physically engage or contact the carryback material that has adhered to the interior cavity.

The carryback clean out system 61 may utilize one or more optimization parameters to prioritize or weigh different aspects of the clean out process when generating the clean out path for the work implement. For example, such optimization parameters may include the shortest clean out time, maximizing the amount of material cleaned out of the dump body 44, or minimizing the likelihood of contact between the bucket 17 and the interior surface 46 of the dump body. In one embodiment, the carryback clean out system 61 may optimize the path of the bucket 17 to clean out the interior surface 46 in the least amount of time. In doing so, the path may be designed to maximize the amount of time spent moving material while minimizing the amount of time spent repositioning the bucket 17 for each material removal cycle. In another embodiment, the carryback clean out system 61 may optimize the path of the bucket 17 to clean out the interior surface 46 as thoroughly as possible. In still another embodiment, the carryback clean out system 61 may optimize the path of the bucket 17 to avoid or minimize the likelihood of contact between the bucket and the interior surface 46. In other embodiments, a combination of two or more optimization parameters may be used in order to provide a desired balance between the various optimization parameters.

In some instances, it may be desirable to position the excavator 111 in a central position relative to a longitudinal axis of the dump body 44 and perform the entire clean out process. In other instances, it may be desirable to position the excavator 111 in a first position relative to the dump body 44, move the bucket 17 along a first portion of the path to perform a desired number of clean out cycles of the clean out process. The excavator may then be repositioned to a second position relative to the dump body and spaced from the first position where the bucket 17 is moved along a second portion of the path to perform further clean out cycles. The process of moving the excavator 111 to additional positions and moving the bucket 17 may repeated as desired until the clean out implement or tool has moved along the entire planned path.

If desired, an additional perception system or inspection system may be disposed adjacent the clean out location to determine whether a sufficient amount of material has been cleaned out from the dump body 44. In such case, a new current profile may be generated and compared to the reference profile. In an example, the interior surface 46 may be sufficiently cleaned out if the difference between the current profile and the reference profile is less than the carryback threshold or some other threshold. If additional clean out is desired, a new material removal plan with a new work implement path may be generated.

In another embodiment, the carryback clean out mechanism may embody a robotic arm mechanism (not shown) that is fixed to a transportable base. The robotic arm mechanism may resemble the implement system 12 described above without the propulsion system.

In still another embodiment, the work site 100 may include a rock breaker (not shown) such as a hydraulic hammer or another similar device. In such case, the rock breaker may be used as a carryback clean out mechanism by moving the rock breaker about a desired path without actuating the secondary function such as the hammer mechanism. For example, the bucket 17 of an excavator similar to that depicted at 111 may be replaced by a hydraulic hammer (not shown).

Figure 7:
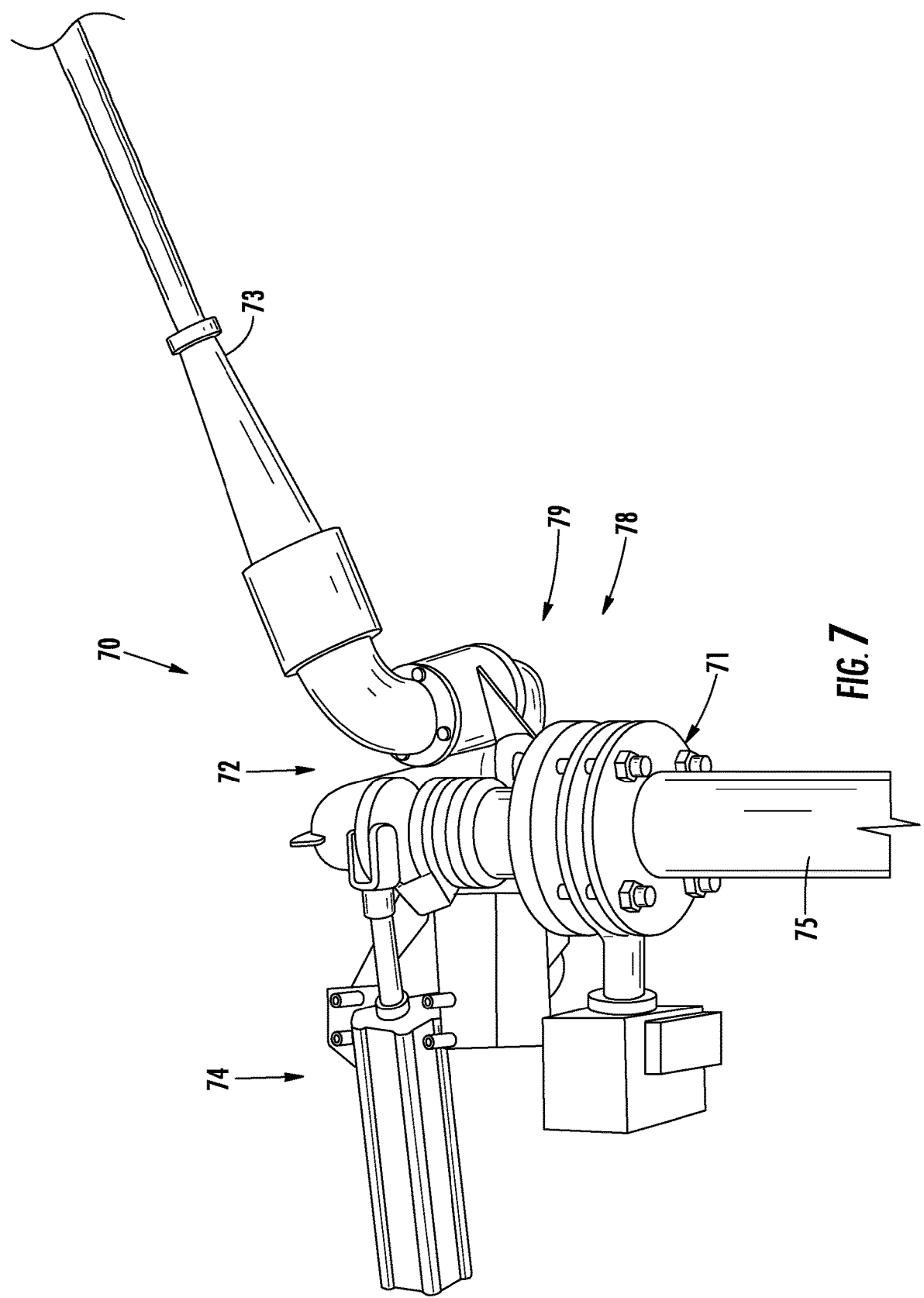
FIG. 7 depicts a perspective view of a water cannon for use with the systems disclosed herein.

In another embodiment, the carryback clean out system 61 may operate in a manner similar to that described above but may substitute a water cannon, water jet or another fluid based system to clean out the interior surface 46 of the dump body. Referring to FIG. 7, an exemplary water cannon 70 is depicted. The water cannon 70 may include an inlet 71 in which water enters the cannon, a motor 72 for pressurizing the water, and a nozzle 73 from which the water exits the cannon. The nozzle 73 may be configured to control the flow in a desired pattern.

The nozzle 73 may be operatively connected to a drive system 74 operative to control the orientation and/or position of the nozzle to direct the flow of water along a desired path. For example, the drive system 74 may include motors for controlling movement of the nozzle 73 along any axes as well as an additional motor for controlling the size of the aperture of the nozzle. The inlet 71 may be connected to a supply line 75 that is further connected to a water supply. In some embodiments, water supply may be a tank (not shown) of a mobile water supply truck (not shown). In other embodiments, the water supply may be a tank fixed at the work site 100 or take any other form.

The water cannon 70 may be associated with a water cannon pose sensing system 78 including a water cannon pose sensor 79 having a plurality of individual sensors that cooperate to generate and provide pose signals indicative of the position and orientation (i.e., the heading, pitch, roll or tilt, and yaw) of the water cannon 70 relative to the work site 100.

The carryback clean out system 61 utilizing the water cannon 70 may operate as described above with respect to the excavator 111 by positioning the haul truck 40 requiring clean out at a desired location relative to the water cannon 70 and positioning the dump body at a desired angular orientation through the use of the hydraulic cylinders 50.

The pose of the dump body 44 may be determined by the dump body pose sensor. Using the pose of the dump body 44, the reference profile, and the current profile of the interior surface 46, the carryback clean out system 61 may determine the pose of the reference profile and the location of the carryback material on the interior surface of the dump body. The water cannon 70 may be positioned as desired adjacent the dump body 44. The pose of the water cannon 70 may be determined with the water cannon pose sensor 79.

Using the pose of the water cannon 70 as well as the pose of the reference model of the interior surface 46 of the dump body 44, the carryback clean out system 61 may determine a plan for removing the carryback material. The plan for removing the carryback material may include directing the nozzle 73 of the water cannon 70 along a path formed or defined by a plurality of cycles or routes to direct water into the interior surface 46 of the dump body 44 to dislodge the carryback material that has adhered to the interior cavity.

As described above, optimization parameters may be used to prioritize or weigh different aspects of the clean out process. As also described above, in some instances it may be desirable to position the water cannon 70 in a central position relative to the dump body 44 and perform the entire clean out process. In other instances, it may be desirable to position the water cannon 70 in a first position relative to the dump body 44, perform a desired number of clean out cycles, and then reposition the water cannon to one or more subsequent positions relative to the dump body and perform further clean out cycles at the subsequent positions until the interior surface 46 has been sufficiently cleaned out.

The control system 115 may further include a machine routing and planning system 117 (FIG. 1) that operates to determine when haul trucks 40 should be routed through the cleanup process. The machine routing and planning system 117 functions to plan the operation and routes of the machines 10 operating at the work site 100.

For example, a work site 100 such as a mine site may include a plurality of loading machines such as excavators 11 and a plurality of haul trucks 40 operating to move material from one or more dig locations to one or more dump locations. The machine routing and planning system 117 may be configured to perform the planning operation while optimizing certain performance goals associated with the material movement process. These performance goals may include minimizing the wait or idle time of the excavators 11, minimizing the wait or idle time of the haul trucks 40 at the load locations, minimizing the travel distance of the haul trucks, maximizing the output of material at the work site 100, or maximizing or minimizing any other goals. Some of the performance goals may result in minimizing operational costs, while others may maximize production. In some instances, a combination of performance goals may be utilized to maximize the efficiency or some other aspect of the material movement process.

The machine routing and planning system 117 may generate different plans depending upon the number of each type of machine 10 that are available and the desired performance goals. In one embodiment, as part of the planning process, a cost may be associated with each type of machine. In one embodiment, the cost may be a rate per hour. In another embodiment, the cost may be based upon a quantity of material. In embodiments, the quantity may be expressed as a function of weight or volume (e.g., a rate per unit weight or a rate per unit volume).

The machine routing and planning system 117 may simulate the operation of a plurality of machines in order to determine the desired operation or routing for each haul truck 40. In some operations, it has been found that an efficient operation of a mine site results from minimizing the idle time of the excavators by providing a sufficient number of haul trucks. In such case, the machine routing and planning system 117 may be used to determine a desired number of haul trucks 40 necessary to minimize the idle time of the excavators 11 in view of the cost of operation of the haul trucks 40, the travel distances between the load locations 101 and the dump locations 102 as well as the other performance goals.

An additional factor that will impact the operation of the machines at the work site is the amount of carryback material within the dump body 44 of each haul truck 40. More specifically, upon performing each load and dump cycle (i.e., loading a haul truck 40 and then dumping the material at a dump location 102), additional carryback material will typically adhere to the dump body 44. As a result of the carryback material, the current or effective capacity or the amount of material that can be carried from a load location 101 to a dump location will decrease as will the fuel efficiency on the return trip. Accordingly, the actual hourly cost of operation of the haul trucks 40 will increase as a result of the carryback material. As the cost of operation of the haul trucks 40 increases due to the carryback material, the economics of the operation at the work site may change.

The machine routing and planning system 117 may thus also be configured to further optimize performance at the work site 100 in view of the amount of carryback material within each haul truck 40. In doing so, the machine routing and planning system 117 may monitor the amount of carryback material within each haul truck 40 and determine the current or effective capacity of each haul truck. The machine routing and planning system 117 may compare the productivity loss as a result of the carryback material against the productivity loss as a result of taking a haul truck out of service as part of the clean out operation to remove carryback material.

More specifically, as stated above, as the amount of carryback material increases, the effective capacity (i.e., the volume and/or weight available for carrying material within the dump body 44) decreases, thus increasing the cost of operation of each haul truck 40. In one example, the machine routing and planning system 117 may revise or modify the cost of operation of each haul truck based upon the amount of carryback material within its dump body 44. To do so, the machine routing and planning system 117 may determine an initial amount of carryback material within the dump body 44 of each haul truck 40 and then determine or access an initial effective capacity of each haul truck based in part on the initial amount of carryback material. The machine routing and planning system 117 may generate an initial material movement plan based upon the number of loading machines and haul trucks at the work site 100 or associated with a specific loading machine and the capacity of each loading machine and the initial effective capacity of each haul truck. The excavators 11 and haul trucks 40 may then be operated at the work site 100 by generating initial movement command signals to operate according to the initial material movement plan.

As the haul trucks 40 are operated at the work site 100, they will be loaded, moved about the work site, unloaded, and occasionally cleaned out at a clean out station 107, 108. During such operation, the amount of carryback material within the dump body of each haul truck 40 will change. Accordingly, a carryback monitoring system 60 may be used to determine a current amount of carryback material within the dump body 44 of each haul truck 40. The machine routing and planning system 117 may access a modified effective capacity of each haul truck 40 based in part on the current amount of carryback material within each haul truck and generate a modified material movement plan based upon the number of loading machines and haul trucks and the modified effective capacity of each haul truck. The excavators 11 and haul trucks 40 may then be operated at the work site 100 by generating modified movement command signals to operate according to the modified material movement plan.

During operation, the machine routing and planning system 117 may compare the productivity loss as a result of the amount of carryback material within each haul truck 40 against the productivity loss as a result of taking one or more haul trucks out of service as part of a clean out operation to remove carryback material. In doing so, the productivity loss as a result of taking the haul truck out of service may include costs associated with cleaning out the interior surface of the dump body such as the cost to operate the clean out mechanism and the costs associated with travel time to and from a clean out station 107, 108. Further, the productivity loss as a result of the amount of carryback material may be based in part upon a distance between load locations 101 and dump locations 102.

While performing the analysis of comparing the productivity loss due to carryback material within the haul trucks 40 against the productivity loss due to clean out operations, the machine routing and planning system 117 determine a total unit cost of operation for the machines at the work site and compare the total unit costs. The total unit costs may be expressed in any desired manner. In one example, the total unit cost may be expressed as a cost per unit time. In another example, the total unit cost may be expressed as a cost based on quantity of material moved. In such case, the quantity of material moved may be expressed as a cost per unit volume or as a cost per unit weight.

In another example, the machine routing and planning system 117 may adjust the amount (e.g., volume or weight) of material that may be carried by each haul truck 40 based upon the amount of carryback material. The machine routing and planning system 117 may thus adjust the operation plan for the machines 10 with the haul trucks 40 routed by the machine routing and planning system based upon the revised or modified cost of or revised or modified available volume or weight of material that may be carried by each haul truck.

The machine routing and planning system 117 may also use material characteristics of the material being moved to proactively manage or plan for clean out operations as result of carryback material. More specifically, some types of material or geology may be more prone to carryback. In addition, weather conditions may also play a role in the amount of carryback. The machine routing and planning system 117 may have stored or access a database having expected carryback for each configuration of haul truck 40 at a work site 100 based upon the characteristics of the material being moved and the weather conditions at the work site. The database may include the expected amount of carryback material associated with each haul truck as function of the number of load/dump cycles. In some instances, the carryback information within the database may also depend on the machine or type of machine used to load each haul truck 40.

Geology samples may be taken from locations at which future mining operations will occur. Upon analyzing the samples, the material characteristics may be stored within a database associated with the machine routing and planning system 117. Based upon the material characteristics of the geology samples and the types of machines that will be performing the future mining operations, the expected amount of carryback may be anticipated—as well as preferred or desired removal options.

In one embodiment, the machine routing and planning system 117 may use the anticipated carryback to more accurately plan for machine operation in terms of the number of required or desired haul trucks 40. In another embodiment, the machine routing and planning system 117 may use the expected amount of carryback material to reduce the frequency of scanning the dump bodies 44 of the haul trucks 40 during machine operation. In other words, rather than using the perception system 35 prior to the first load of each loading cycle, the machine routing and planning system 117 may identify when the perception system should be used to scan the dump body. The machine routing and planning system 117 may be configured to direct a haul truck 40 to a scanning process after a specified number of load/dump cycles and the specified number may be based upon the material characteristics of the material being moved.

The machine routing and planning system 117 may also be configured to direct the haul truck 40 to a scanning process based upon the weight of the carryback material within the haul truck based upon payload estimation from the payload estimation system 57. More specifically, the payload estimation system 57 may determine the weight of the carryback material within the dump body 44. Based upon the material characteristics of the material being moved, the machine routing and planning system 117 may determine the volume of material within the dump body. The machine routing and planning system 117 may equate the volume of carryback material to a percentage of the capacity of the dump body 44 and determine that a clean out operation is desired. In such case, the machine routing and planning system 117 may direct the haul truck 40 to a perception system 35 to perform a scanning operation and then to a clean location for a clean out operation.

Still further, based upon the material characteristics of the material being moved, the machine routing and planning system 117 may determine the type of clean out mechanism to be used. For example, water cannons 70 may be better suited to remove some materials than others. In addition, the material characteristics may be used to determine the operating characteristics and/or path of the clean out process. For example, the flow rate and pressure of the fluid as well as the rate at which the nozzle 73 traverses its desired path. Further, the material characteristics may also be used to improve or optimize the path traveled by any type of clean out mechanism.

In an alternate or further embodiment, the control system 115 may include a carryback clean out planning system 62 (FIG. 1) that is operative to adjust or modify the carryback threshold of each haul truck 40 based upon performance or operating conditions at the work site 100. As a first example, the carryback threshold may be set at a first value. In such case, each time the amount of carryback material in a dump body 44 exceeds the clean out threshold, the haul truck 40 may be designated for a clean out operation. However, if at least one haul truck 40 is taken out of service (e.g., an operator is on a break, a machine is being refueled, a machine is our for service or repair, or a machine has been misrouted), a fewer number of haul trucks may be available and the carryback clean out planning system 62 may increase the carryback threshold so that a greater amount of carryback material is required before a machine is designated for clean out. By increasing the carryback threshold, the likelihood is reduced that an excavator 11 will be idle while waiting for a haul truck 40.

If a second haul truck 40 is taken out of service, the carryback threshold may be reduced again. As haul trucks 40 are returned to service, the carryback threshold may be increased to or towards the original carryback threshold.

In an example, the carryback threshold may be set at 10% of the volume of the dump body 44. As each haul truck 40 is taken out of service, the carryback clean out planning system 62 may increase the carryback threshold by 5%. Thus, the first haul truck removed from service results in an increase to 15%. The second haul truck 40 removed from service results in the carryback threshold being increased to 20%.

The increases and decreases in the carryback threshold may or may not be linear. For example, upon removing a first haul truck 40 from service, the carryback threshold may increase by a first amount. Upon removing a second haul truck 40 from service, the carryback threshold may be increased by a second, greater amount. Using the example set forth above, the removal of a first haul truck 40 from service will result in any increase in the carryback threshold to 15% but the removal of a second haul track will result in an increase in the carryback threshold to a number greater than 20%. By doing so, the carryback monitoring system 60 is less likely to designate a haul truck for a clean out operation.

In an alternate embodiment, the machine routing and planning system 117 may be configured to continue to direct haul trucks designated for clean out between load locations 101 and dump locations 102. The machine routing and planning system 117 may be configured to release haul trucks 40 designated for clean out after comparing the cost of running or operating the haul trucks in a less efficient manner with the substantial carryback against the potential cost of a excavator 11 being idle.

Similarly, if one of the loading machines such as the excavators 11 is out of service, it may be desirable to reduce the carryback threshold to increase the efficiency of the material moving process. In an example, removing an excavator 11 from operation may result in the carryback threshold being lowered from 10% to 5%.

INDUSTRIAL APPLICABILITY

The industrial applicability of the systems described herein will be readily appreciated from the forgoing discussion. The foregoing discussion is applicable to systems used with machines such as haul trucks 40 that haul material at a work site 100. Such work sites may include a mining site, a landfill, a quarry, a construction site, a roadwork site, or any other area in which material is transported. Carryback material located within the dump body 44 of a haul truck 40 may reduce the operating efficiency of the material moving process.

Figure 8:
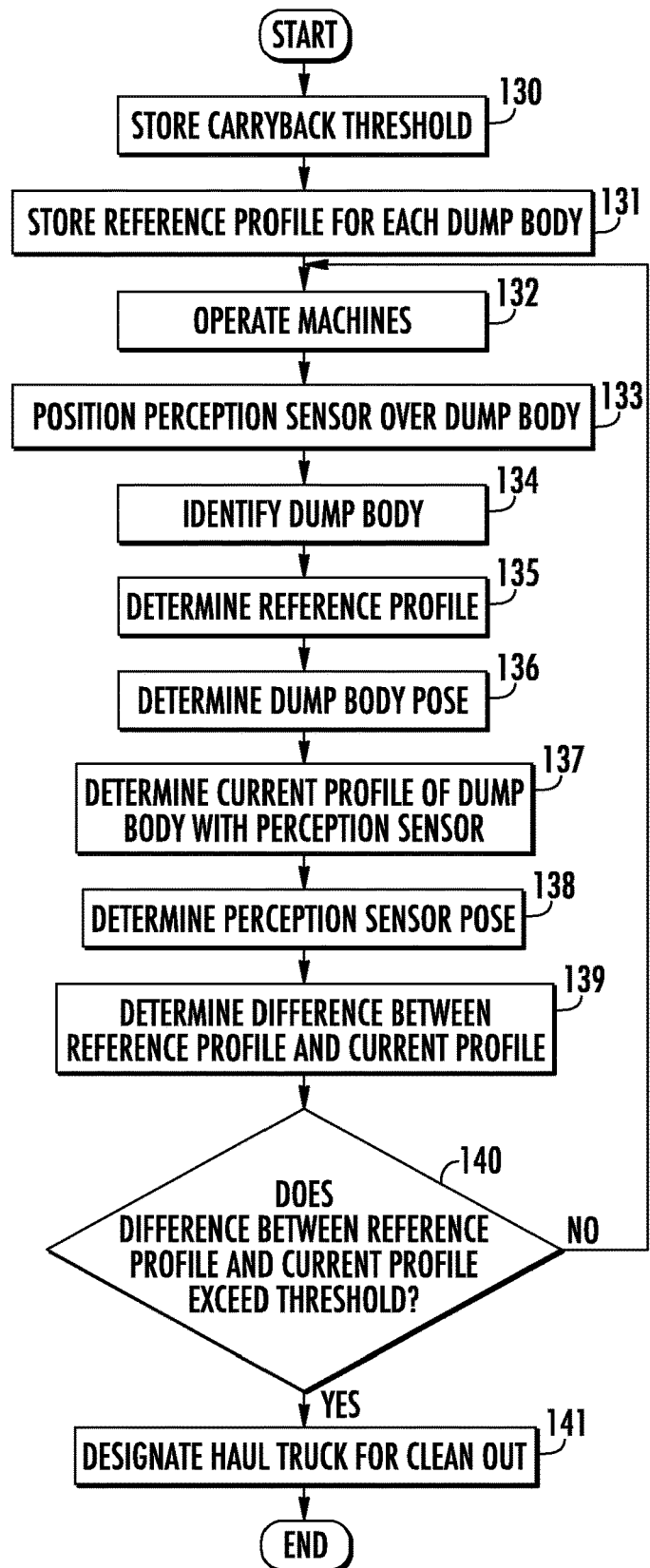
FIG. 8 depicts a flowchart illustrating the operation of an aspect of the systems disclosed herein.

Referring to FIG. 8, a flowchart of the operation of a process for determining, in an autonomous or semi-autonomous manner, whether the dump body 44 of a haul truck 40 should be designated for a clean out operation. At stage 130, one or more carryback thresholds may be stored within controller 116. The carryback threshold may define a percentage of an empty dump body 44 or a volume of material. In an embodiment, if the carryback threshold is defined in terms of a percentage, the carryback thresholds may be identical for all of the haul trucks 40 operating at the work site 100. In other embodiments, and particularly if the carryback threshold is defined in terms of a volume of material, the carryback threshold may be different for different haul trucks 40.

In some instances, multiple carryback thresholds may be stored for each haul truck 40. The multiple carryback thresholds could be used as part of a prioritization scheme to prioritize a subsequent clean out operation. For example, a first carryback threshold having a first percentage and a second carryback threshold having a second, higher percentage could be used with each haul truck 40. Upon exceeding the first threshold, the haul truck may be designated for a clean out operation. Depending upon the operation of other machines at the work site 100, such clean out operation may not occur immediately. In such case, the haul truck 40 may continue to operate at the work site 100 transporting material between the load location 101 and the dump location 102. If the amount of carryback material within the dump body 44 continues to increase, the amount of carryback material may eventually exceed the second percentage. Upon exceeding the second carryback threshold, the haul truck 40 may receive a higher priority for a clean out operation.

At stage 131, a reference profile for each dump body 44 may be stored within the controller 116. Each reference profile may be associated with a unique identification code or other identifier associated with each haul truck 40 and as maintained within a database associated with the machine routing and planning system 117. The machines 10 may be operated at the work site 100 at stage 132. In doing so, the loading machines such as excavators 11 may load haul trucks 40 at load locations 101 with material. The loaded haul trucks 40 may then travel to the dump locations 102 where the material is dumped. The empty haul trucks 40 may then returned back to the load locations 101 to begin the next load/dump cycle.

After an empty haul truck 40 is positioned at a load location 101, a loading machine such as an excavator 11 may move its bucket 17 filled with material to a position above the dump body 44. Since the perception sensor such as camera system 36 may be positioned on the stick member 23 adjacent the bucket 17, moving the excavator in this manner positions at stage 133 the camera system over the dump body 44.

Upon positioning the haul truck 40 adjacent the excavator 11, the identity of the haul truck 40 and thus the dump body 44 may be communicated at stage 134 to the controller 116. In one embodiment, the wireless communications system on board the haul truck 40 may communicate the identifying code of the haul truck to the controller 116 and the controller may use the identifying code to identify the dump body 44. At stage 135, the controller 116 may determine the reference profile of the dump body 44 of the haul truck 40 based upon the identifying code of the haul truck.

At stage 136, the pose of the dump body 44 may be determined. The position or pose of the dump body 44 may be determined from the dump body pose signals from the haul truck pose sensor 55. The current profile of the interior surface 46 of the dump body 44 may be determined at stage 137 by the camera system 36. At stage 138, the pose of the camera system 36 may be determined based upon implement system pose data from the implement system pose sensor 33 and the kinematics of the implement system 12.

The differences between the reference profile and the current profile of the interior surface 46 of the dump body 44 may be determined at stage 139. In one embodiment, the reference profile may be depicted as an electronic map relative to the work site 100 and the current profile may also be depicted as an electronic map relative to the work site. The two electronic maps may be compared with the difference reflecting the carryback material retained within the interior of the dump body 44.

At decision stage 140, the controller 116 may determine whether the difference between the reference profile and the current profile exceeds the carryback threshold. If the carryback threshold is not exceeded, the machines 10 may continue to operate and stages 132-140 repeated. If the carryback threshold is exceeded, the haul truck 40 may be designated by the controller 116 at stage 141 for a clean out operation. In some instances, the haul truck 40 may be directed to a clean out site relatively quickly. In other instances, the haul truck 40 may continue to operate along with the other machines and stages 132-140 repeated until the haul truck is directed to a clean out site.

Figure 9:
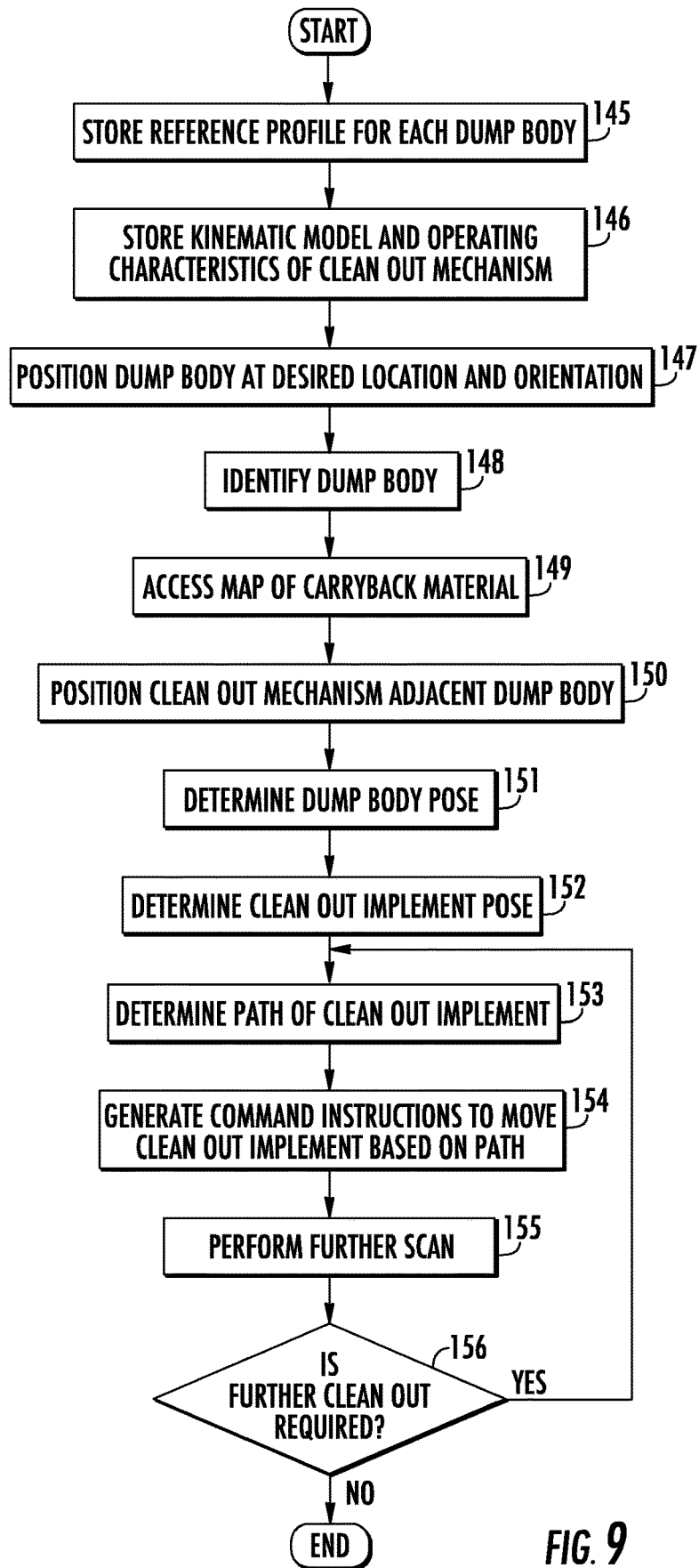
FIG. 9 depicts a flowchart illustrating the operation of a second aspect of the systems disclosed herein.

Referring to FIG. 9, a flowchart of an autonomous or semi-autonomous clean out operation is depicted. At stage 145, a reference profile for each dump body 44 may be stored within the controller 116. Each reference profile may be associated with a unique identification code or other identifier associated with each haul truck 40. The kinematic model and operating characteristics of the clean out mechanism such as the excavator 111 may be stored within controller 116 at stage 146. In embodiments utilizing other types of clean out mechanisms, such as the water cannon 70, a kinematic model may not be stored.

The dump body 44 of the haul truck 40 to be cleaned out may be positioned at a desired clean out location and in a desired orientation at stage 147. In an embodiment, the hydraulic cylinders 50 may be fully extended to position the dump body 44 at its fully raised position to assist in the clean out process. In other embodiments, the hydraulic cylinders 50 may be only partially extended to only partially raise the dump body 44.

At stage 148, the identity of the haul truck 40 and thus the dump body 44 may be communicated to the controller 116. In one embodiment, the wireless communications system on-board the haul truck 40 may communicate the identifying code of the haul truck to the controller 116 and the controller may use the identifying code to identify the dump body 44.

The controller 116 may access at stage 149 an electronic map of the carryback material disposed within the interior surface 46 of the dump body 44. In one embodiment, the electronic map may be generated during an autonomous or semi-autonomous process of determining whether a clean out operation is desired or necessary such as set forth in the flowchart of FIG. 8 above. In an embodiment in which a dump body 44 has been designated for a clean out operation without generating an electronic map of the carryback material (e.g., with a manual designation), electronic map of the carryback material may be generated at the clean out station 107, 108.

The clean out mechanism such as excavator 111 may be positioned adjacent the dump body 44 as desired at stage 150. At stage 151, the pose of the dump body 44 may be determined. The position or pose of the dump body 44 may be determined from the dump body pose signals from the haul truck pose sensor 55.

At stage 152, the pose of the clean out implement such as bucket 17 may be determined based upon implement system pose signals or data from the implement system pose sensor 33 and the kinematics of the implement system 12. In other words, the implement system pose sensor 33 operates as a clean out system pose sensor and generates clean out implement pose signals that are used with the kinematics to determine the pose of the clean out implement.

The controller 116 may generate at stage 153 a path to move the bucket 17 to physically engage or contact the carryback material that is stuck to the interior surface 46 of the dump body 44. The controller 116 may generate at stage 154 movement command signals to move the bucket 17 along the path to perform a clean out operation on the interior surface 46 of the dump body 44.

In some embodiments, the operation set forth in stages 145-154 may be terminated upon the completion of stage 154. In other embodiments, an additional scanning operation may be performed at stage 155. The scanning operation may be performed with a perception sensor such as cameras system 36 to generate an updated current profile of the interior surface 46 of the dump body 44 as described above. The updated current profile together with the pose of the perception sensor may be used to generate an updated electronic map of the current profile relative to the work site 100. The updated electronic map of the current profile relative to the work site 100 may be compared to the an electronic map of the reference profile relative to the work site to generate an updated electronic map of the carryback material within the dump body 44. The updated electronic map of the carryback material may be compared to a carryback threshold at stage 156 to determine whether any further clean out operations are required. If no further clean out operations are required, the haul truck 40 may be returned to operation at the work site 100. If further clean out is required, stages 153-156 may be repeated.

Figure 10:
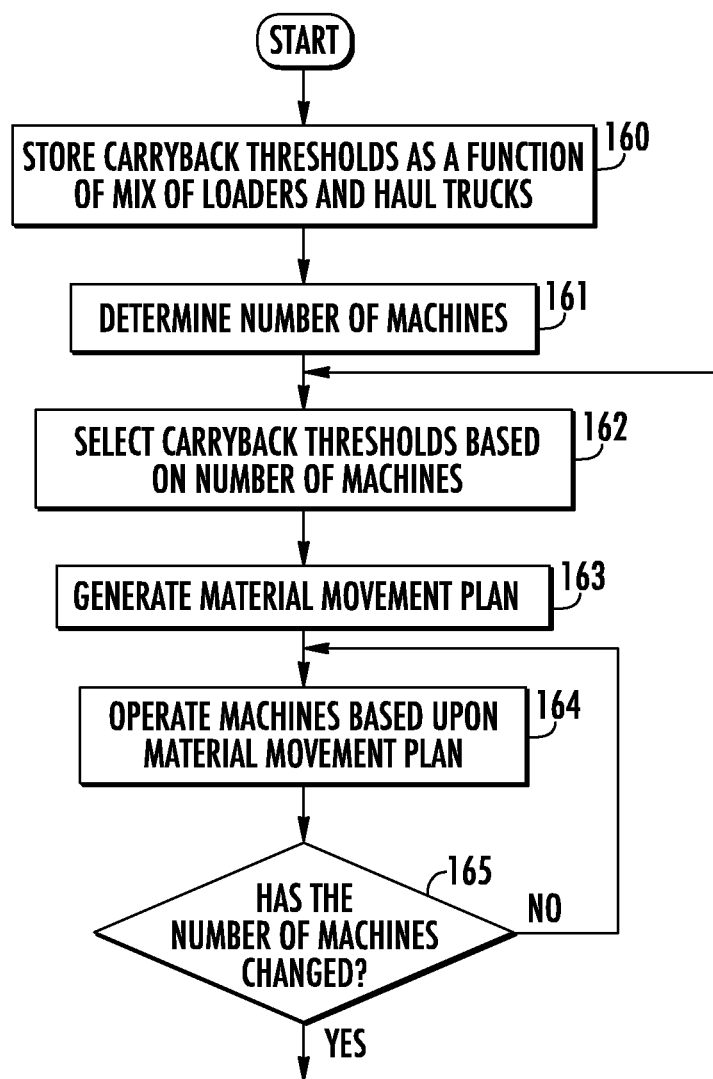
FIG. 10 depicts a flowchart illustrating the operation of a third aspect of the systems disclosed herein.

Referring to FIG. 10, a flowchart of an aspect of the operation of the machine routing and planning system 117 is depicted. At stage 160, a plurality of carryback thresholds may be stored within or accessed by the controller 116. Each carryback threshold may be expressed in any manner such as, for example, as a percentage of the volume of an empty dump body. A different carryback threshold may be used based upon the mix of loading machines and haul trucks 40 being used at the work site 100. For example, it may be desirable to use a lower carryback threshold with a greater number of haul trucks 40 is assigned to each excavator 11 and a relatively higher carryback threshold when a smaller number of haul trucks is assigned to each excavator. With a higher carryback threshold each haul truck 40 is less likely to be designated for a clean out operation. Accordingly, a greater number of haul trucks 40 will remain in service, thus reducing the likelihood that a loading machine such as an excavator 11 will be idle.

As described above, the plurality of carryback thresholds may be identical for each haul truck 40 or may be different, such as depending upon the size and/or configuration of the haul truck or its dump body 44. In some instances, the carryback thresholds may depend upon the type of material being hauled.

At stage 161, the controller 116 may determine an initial number of machines including the number of loading machines and haul trucks 40 operating at the work site 100. At stage 162, the controller 116 may select or assign a carryback threshold to each haul truck 40 based upon the initial number of loading machines and haul trucks as well as the mix of loading machines and haul trucks operating at the work site 100. Inasmuch as the ratio of haul trucks to loading machines may be different at different locations at the work site 100, different carryback thresholds may be used at different locations at the work site. For example, a first carryback threshold may be used with all of the haul trucks 40 assigned to a first excavator 11 and a second carryback threshold used with all of the haul trucks assigned to a second excavator.

The machine routing and planning system 117 may generate at stage 163 an initial material movement plan for operating machines such as the excavators 11 and haul trucks 40 at the work site based upon the initial number of machines operating at the work site 100. The initial material movement plan may also be based upon the initial carryback threshold that was selected based upon the initial number of loading machines and haul trucks operating at the work site 100.

The machines may be operated and moved about the work site 100 at stage 164 according to the initial material movement plan. To do so, the controller 116 (e.g., excavator controller 31, haul truck controller 53) may generate initial movement command signals to direct the movement of the machines.

As the haul trucks 40 perform each load/dump cycle, carryback material may tend to build up on the interior surface 46 of the dump body 44 of each haul truck. Accordingly, it may be desirable, at times, to remove one or more haul truck 40 from service so that a clean out operation may be performed. In addition, other haul trucks 40 may be removed from service for other reasons including an operator taking a break, a machine being refueled, a machine requires service or has broken down, or a machine has been misrouted. In such case, the number of haul trucks assigned to each loading machine may be reduced. In other instances, a loading machine such as an excavator 11 may be removed from service for any of a plurality of reasons. In those instances, the number of haul trucks 40 assigned to each of the remaining loading machines may be increased.

From the foregoing, it may be understood that the ratio or mix of the loading machines and haul trucks 40 may change during the course of operation at a work site 100. Accordingly, at decision stage 165, the controller may determine whether the number of operating machines at the work site has changed and thus whether the mix or ratio of loading machines and haul machines has changed. If the number of machines operating at the work site 100 has not changed (and thus the ratio of machines has not changed), the machines may continue to operate based upon the initial material movement plan and stages 164-165 repeated.

If the number of machines operating at the work site 100 has changed and thus the ratio has changed, the machine routing and planning system 117 may generate a modified initial material movement plan in view of the new number of machines and stages 162-165 repeated. More specifically, at stage 162, the controller 116 may select or assign a new or modified carryback threshold to each haul truck 40 based upon the new or modified number of loading machines and haul trucks as well as the mix of loading machines and haul trucks operating at the work site 100. At stage 163 a new or modified material movement plan may be generated based upon the modified number of machines operating at the work site 100. At stage 164, the machines may be operated and moved about the work site 100 according to the modified material movement plan by generating modified movement command signals to direct the movement of the machines.

Figure 11:
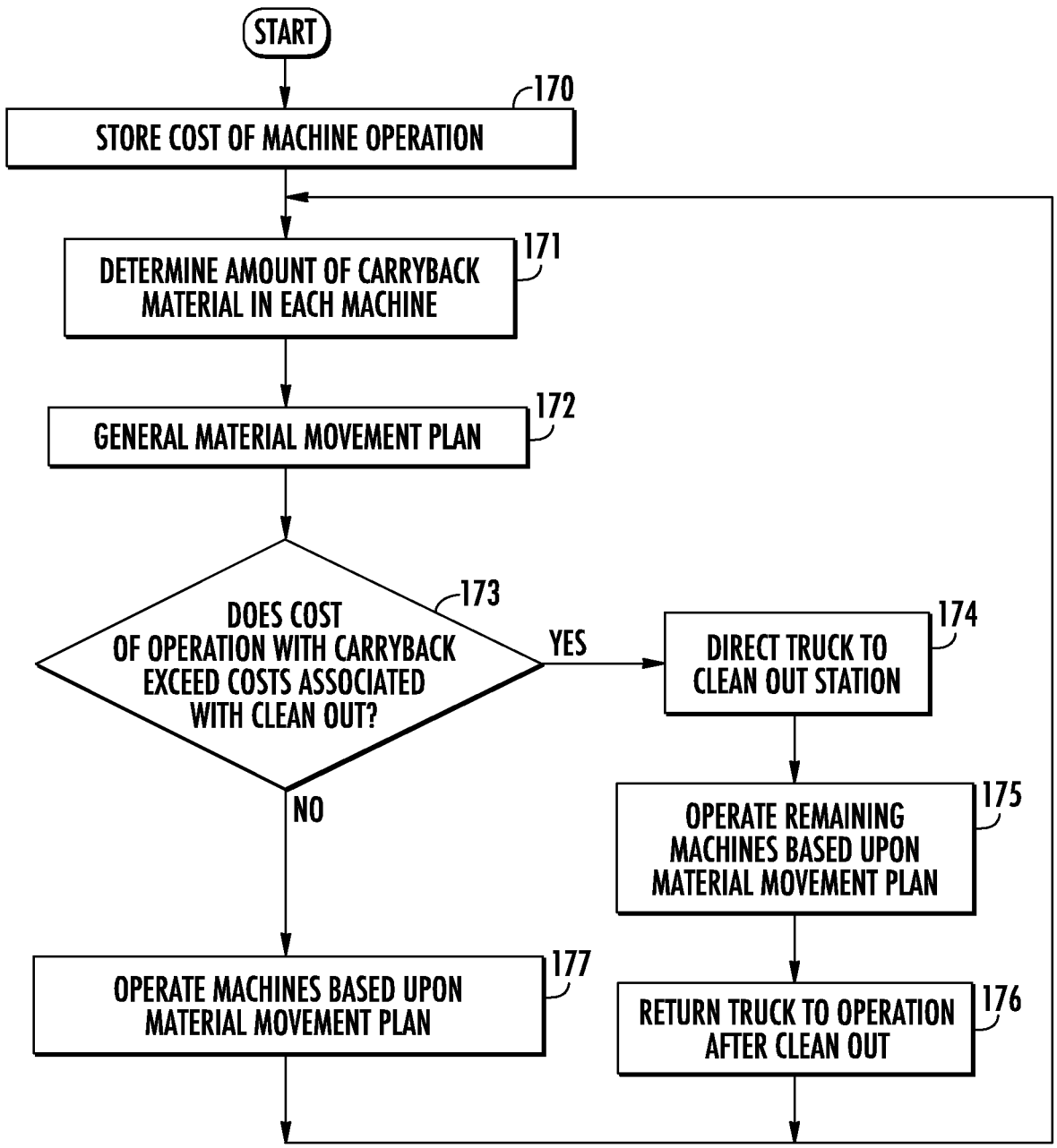
FIG. 11 depicts a flowchart illustrating the operation of a fourth aspect of the systems disclosed herein.

Referring to FIG. 11, a flowchart of another aspect of the operation of the machine routing and planning system 117 is depicted. At stage 170, the cost of operation and/or the capacity (e.g., volume) of each machine operating at the work site 100 may be stored within or accessed by the controller 116. In doing so, the cost of operation and/or capacity of each loading machine such as excavators 11 may be stored. In addition, the cost of operation and/or the capacity of each haul truck 40 may also be stored. Since the cost of operation and/or capacity of each haul truck 40 may vary or change depending upon the amount of carryback material within the dump body 44, the controller 116 may include a plurality of costs of operation for each haul truck 40, with each corresponding to an amount of carryback material. The cost of operation may be expressed as a function of time, the volume of the material moved, the weight of the material moved, or in any other desired manner.

A system such as carryback monitoring system 60 may be used at stage 171 to determine the amount of carryback material within the dump body 44 of each haul truck 40. The process at stage 70 may correspond to scanning or otherwise determining the amount of carryback material within one or more dump bodies 44 together with accessing stored data from previous scans or determinations of the amount of carryback material within other dump bodies. In other words, the interior surface 46 of each dump body 44 may not be scanned at the same time.

At stage 172, the machine routing and planning system 117 may generate a material movement plan for operating the machines such as the excavators 11 and haul trucks 40 at the work site 100 based upon one or more factors including the amount of carryback material within each haul truck 40. More specifically, in an embodiment, the machine routing and planning system 117 may be configured to plan the routes of the haul trucks 40 based upon the effective capacity of each haul truck based upon the amount of carryback material within each haul truck.

In some instances, the machine routing and planning system 117 may further compare at decision stage 173 the productivity loss as a result of the carryback material within each haul truck 40 against the productivity loss as a result of taking one or more haul trucks out of service as part of a cleanout operation to remove carryback material. In one example, the machine routing and planning system 117 may determine a total unit cost of operation for the machines at the work site 100 (or a portion of the work site such as a specific loading machine and haul trucks dedicated to the specific loading machine) in view of the carryback material. Various manners of determining the total unit cost of operation are contemplated. Further, various other manners of optimizing the performance of the machines at the work site 100 other than based on cost are contemplated.

As the machine routing and planning system 117 operates, it may determine whether the cost of operation with the carryback material within the haul trucks 40 exceeds the costs associated with a cleanout operation. More specifically, the machine routing and planning system 117 may determine the total unit cost of operation including haul trucks 40 with carryback material. The machine routing and planning system 117 may also determine the total unit cost associated with removing one or more haul trucks 40 from material moving operations and performing a clean out operation while the remaining haul trucks continue to operate. Based upon the determination of the total unit cost of operation including haul trucks 40 with the carryback material and the total unit cost of operation based on the remaining haul trucks while removing one or more haul trucks for a clean out operation, the machine routing and planning system 117 may determine whether to re-route or direct one or more haul trucks to a clean out station 107, 108.

If the cost of operation with the carryback material exceeds the costs associated with a cleanout operation at decision stage 173, movement command signals may be generated to direct one or more haul trucks 40 at stage 174 to a clean out station 107, 108. In such case, the material movement plan generated at 172 may route at stage 175 the remaining haul trucks 40 to optimize the performance at the work site 100. Such optimization may include one or more optimization parameters or goals such as reducing total costs, maximizing the amount of material being moved, or any other desired parameter or goal.

As each clean out operation is completed, the empty haul truck 40 may be returned at stage 176 to operation by directing the empty haul truck to the desired load location 101. Upon returning the empty haul truck 42 operation, a new analysis of the carryback material in each haul truck and new material movement plan may be generated with stages 171-177 repeated.

If the cost of operation with the carryback material does not exceed the costs associated with a cleanout operation at decision stage 173, movement command signals may be generated at stage 177 to route all of the haul trucks 40 to optimize the performance at the work site 100. The haul trucks 40 may operate at the work site 100 and stages 171-177 repeated each time a haul truck is scanned or the amount of carryback material is otherwise determined.

From the foregoing, it may be understood that the machine routing and planning system 117 may continuously operate in order to optimize the performance at the work site 100. In doing so, each time there is a change in the amount of carryback material, it may be desirable to generate a new material movement plan and/or determine whether it is desirable to send one or more haul trucks 40 to a clean out operation. Changes in the amount of carryback material may occur, for example, each time a dump body 44 is scanned or after a dump body is cleaned out.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A machine routing and planning system for mobile machines at a work site, the system comprising:

a plurality of haul trucks, each haul truck having a dump body for hauling material, the dump body having an interior surface;

at least one loading machine for loading material into the dump body of each haul truck; and a controller configured to:

access an initial number of loading machines and haul trucks operating at the work site;

access an initial carryback threshold for the interior surface of each haul truck based on the initial number of loading machines and haul trucks operating at the work site;

generate an initial material movement plan based upon the initial number of loading machines and haul trucks and the initial carryback threshold;

generate initial movement command signals to operate the loading machines and haul trucks at the work site based upon the initial material movement plan;

access a modified number of loading machines and haul trucks operating at the work site;

access a modified carryback threshold for the interior surface of each haul truck based on the modified number of loading machines and haul trucks operating at the work site;

generate a modified material movement plan based upon the modified number of loading machines and haul trucks and the modified carryback threshold; and generate modified movement command signals to operate the loading machines and haul trucks at the work site based upon the modified material movement plan.

2. The system of claim 1, wherein the modified carryback threshold is greater than the initial carryback threshold upon a decrease in a number of haul trucks operating at the work site without a change in a number of loading machines operating at the work site.

3. The system of claim 1, wherein the modified carryback threshold is less than the initial carryback threshold upon an increase in a number of haul trucks operating at the work site without a change in a number of loading machines operating at the work site.

4. The system of claim 1, wherein a difference between the initial carryback threshold and the modified carryback threshold is linear relative to a change in a number of haul trucks operating at the work site.

5. The system of claim 1, wherein a difference between the initial carryback threshold and the modified carryback threshold is nonlinear relative to a change in a number of haul trucks operating at the work site.

6. The system of claim 1, wherein each material movement plan is determined based upon a cost of operating each machine.

7. The system of claim 6, wherein the cost of operating each machine is expressed as a cost per unit time.

8. The system of claim 6, wherein the cost of operating each machine is expressed as a cost based on quantity of material moved.

9. The system of claim 8, wherein the cost based on quantity of material moved is expressed as a cost per unit volume.

10. The system of claim 9, wherein the cost based on quantity of material moved is expressed as a cost per unit weight.

11. The system of claim 1, further comprising a carryback monitoring system to determine an amount of carryback material within the dump body of each haul truck.

12. The system of claim 11, wherein each material movement plan is based upon an effective volume of the dump body of each haul truck.

13. The system of claim 11, wherein each material movement plan includes designating each haul truck for a clean out operation upon the amount of carryback material exceeding a current carryback threshold, and directing a haul truck to a clean out station after designating the haul truck for the clean out operation.

14. The system of claim 13, wherein each material movement plan includes directing haul trucks to the clean out station based upon a prioritization scheme.

15. A method of machine routing and planning for mobile machines at a work site comprising:
   accessing an initial number of loading machines and haul trucks operating at the work site, each haul truck having a dump body for hauling material, the loading machines configured for loading material into the dump body of each haul truck;
   accessing an initial carryback threshold for an interior surface of each haul truck based on the initial number of loading machines and haul trucks operating at the work site;
   generating an initial material movement plan based upon the initial number of loading machines and haul trucks and the initial carryback threshold;
   generating initial movement command signals to operate the loading machines and haul trucks at the work site based upon the initial material movement plan;
   accessing a modified number of loading machines and haul trucks operating at the work site;
   accessing a modified carryback threshold for the interior surface of each haul truck based on the modified number of loading machines and haul trucks operating at the work site;
   generating a modified material movement plan based upon the modified number of loading machines and haul trucks and the modified carryback threshold; and
   generating modified movement command signals to operate the loading machines and haul trucks at the work site based upon the modified material movement plan.

16. The method of claim 15, wherein upon a decrease in a number of haul trucks operating at the work site without a change in a number of loading machines operating at the work site, increasing the initial carryback threshold to define the modified carryback threshold.

17. The method of claim 15, wherein upon an increase in a number of haul trucks operating at the work site without a change in a number of loading machines operating at the work site, decreasing the initial carryback threshold to define the modified carryback threshold.

18. The method of claim 15, further comprising determining an amount of carryback material within the dump body of each haul truck.

19. The method of claim 18, further comprising designating each haul truck for a clean out operation upon the amount of carryback material exceeding a current carryback threshold and directing a haul truck to a clean out station after designating the haul truck for the clean out operation.

20. The method of claim 15, further comprising determining an amount of carryback material within the dump body of each haul truck and generating each material movement plan based upon an effective volume of the dump body of each haul truck.

\* \* \* \* \*